VIBRATORY FREQUENCY STANDARD FOR A TIMEKEEPING DEVICE

Filed July 10, 1964

17 Sheets-Sheet 1

INVENTORS
KLAUS SPARING
WILHELM TILSE
BY
Davis, Hoxie, Faithfull & Hapgood
ATTORNEYS INVENTORS
KLAUS SPARING
WILHELM TILSE
BY
Davis, Hoxie, Faithfull & Hapgood
ATTORNEYS

VIBRATORY FREQUENCY STANDARD FOR A TIMEKEEPING DEVICE

Filed July 10, 1964 17 Sheets-Sheet 3

INVENTORS
KLAUS SPARING
WILHELM TILSE

BY

Davis, Hoxie, Faithfull & Hapgood

ATTORNEYS

VIBRATORY FREQUENCY STANDARD FOR A TIMEKEEPING DEVICE

INVENTORS
KLAUS SPARING
WILHELM TILSE
BY
Davis, Hoxie, Faithfull & Hapgood
ATTORNEYS

VIBRATORY FREQUENCY STANDARD FOR A TIMEKEEPING DEVICE

Filed July 10, 1964 17 Sheets-Sheet 5

INVENTORS
KLAUS SPARING
WILHELM TILSE
BY
Davis, Hoxie, Faithfull & Hapgood
ATTORNEYS INVENTORS
KLAUS SPARING
WILHELM TILSE
BY
Davis, Hoxie, Faithfull & Hapgood
ATTORNEYS INVENTORS
KLAUS SPARING
WILHELM TILSE
BY
Davis, Hoxie, Faithfull & Hapgood
ATTORNEYS Aug. 24, 1965 K. SPARING ETAL 3,201,932

VIBRATORY FREQUENCY STANDARD FOR A TIMEKEEPING DEVICE

Filed July 10, 1964 17 Sheets-Sheet 8

INVENTORS
KLAUS SPARING
WILHELM TILSE

BY

Davis, Hoxie, Faithfull & Hapgood
ATTORNEYS

INVENTORS
KLAUS SPARING
WILHELM TILSE
BY
Davis, Hoxie, Faithfull & Hapgood
ATTORNEYS Aug. 24, 1965 K. SPARING ETAL 3,201,932

VIBRATORY FREQUENCY STANDARD FOR A TIMEKEEPING DEVICE

Filed July 10, 1964 17 Sheets-Sheet 10

INVENTORS
KLAUS SPARING
WILHELM TILSE

BY

Davis, Hoxie, Faithfull & Hapgood
ATTORNEYS

VIBRATORY FREQUENCY STANDARD FOR A TIMEKEEPING DEVICE

Filed July 10, 1964

INVENTORS
KLAUS SPARING
WILHELM TILSE
BY
Davis, Hoxie, Faithfull & Hapgood
ATTORNEYS Aug. 24, 1965 K. SPARING ETAL 3,201,932

VIBRATORY FREQUENCY STANDARD FOR A TIMEKEEPING DEVICE

Filed July 10, 1964 17 Sheets-Sheet 12

INVENTORS
KLAUS SPARING
WILHELM TILSE
BY
Davis, Hoxie, Faithfull & Hapgood
ATTORNEYS INVENTORS
KLAUS SPARING
WILHELM TILSE
BY
Davis, Hoxie, Faithfull & Hapgood
ATTORNEYS INVENTORS
KLAUS SPARING
WILHELM TILSE
BY
Davis, Hoxie, Faithfull & Hapgood
ATTORNEYS INVENTORS
KLAUS SPARING
WILHELM TILSE
BY
Davis, Hoxie, Faithfull & Hapgood
ATTORNEYS INVENTORS
KLAUS SPARING
WILHELM TILSE
BY
Davis, Hoxie, Faithfull & Hapgood
ATTORNEYS.

VIBRATORY FREQUENCY STANDARD FOR A TIMEKEEPING DEVICE

Filed July 10, 1964 17 Sheets-Sheet 17

INVENTORS
KLAUS SPARING
WILHELM TILSE
BY
Davis, Hoxie, Faithfull & Hapgood
ATTORNEYS United States Patent Office 3,201,932

Patented Aug. 24, 1965

3,201,932

VIBRATORY FREQUENCY STANDARD FOR A TIMEKEEPING DEVICE

Klaus Sparing, Pforzheim, and Wilhelm Tilse, Pforzheim-Birkenfeld, Germany, assignors to The United States Time Corporation, Waterbury, Conn., a corporation of Connecticut Filed July 10, 1964, Ser. No. 382,440

8 Claims. (Cl. 58—23)

The present invention relates to a timekeeping device having, as its time standard, a mechanical oscillator excitable to uniform oscillations: This is a continuation-in-part of application Serial No. 325,027, filed November 20, 1963.

In the known timekeeping devices of this type, the oscillator is coupled with the base, so that the oscillation frequency and accuracy is affected by the magnitude of this coupling. By the base is here meant not only the mounting support but the sum of all parts which are firmly connected with the mounting support and are not part of the oscillator. For example, a different damping of the base can affect the coupling and therefore affect the timekeeping accuracy.

In portable timekeeping devices, e.g. wrist watches, in which only energy sources of a relatively small capacity can be used, present devices have the considerable disadvantage that energy is carried to the coupled base. This means energy will be lost. Known devices of this type tried to overcome these disadvantages by having the base, in comparison to the oscillating system, relatively large and heavy. This made the timekeeping device relatively large and heavy, which is undesirable in portable watches. Even so, the loss of energy cannot basically be overcome by such preventive measures. Another disadvantage of this known timekeeping device is that the oscillator is shock sensitive. In response to outside shocks the oscillator changes its oscillation amplitude and frequency. One means to overcome the effect of shock is to use an oscillator, such as a tuning fork, having a high inherent oscillation frequency. In such a high-frequency device the coupling with the base is greater than with an oscillation arrangement of lower frequency, so that the diminution of the disadvantage of shock results in a greater loss of energy.

In accordance with the present invention, an oscillator is positioned on a base and is mechanically driven to uniform oscillation, the oscillation frequency serving as the timekeeping standard. The disadvantages of the prior art devices are avoided by means of an oscillation arrangement which has a multiple of oscillators which compensate for exterior effects. By this compensation practically no effective coupling exists between the base and oscillation system, so that the frequency stability cannot be affected by shock or other force components which act on the base, for instance different damping of the base. Exterior shocks and vibrations, which affect the base, do not affect the frequency stability of these systems, or at least affects them less.

The construction of the present invention can advantageously be made so that the oscillation arrangement has two oscillation systems which have at least one oscillator each, the oscillators being excitable to preferably friction-free oscillations of equal frequency by receiving essentially equal oscillation impulses. Both oscillation systems are arranged so that their exterior reaction sources are essentially opposingly directed. An oscillation arrangement which is oscillation compensated against exterior influences is the result of this construction. As a rule, it is desirable, for production reasons, that at least two oscillators of the oscillation arrangement have equal masses, i.e. equal moments of inertia, and that their directional energy also be equal, i.e. equal direction moments. One construction of the present invention uses rotational oscillators, of which the axes are parallel or aligned together. Each rotational oscillator is formed, for example, wheel-like or sickle-like, so that a single hairspring creates the directional moment which is necessary for the creation of oscillations. Instead of hairsprings, other energy sources can also be provided, such as torsion springs or wheel spokes which are flexible in the circumferential direction. Flexible wheel spokes are advantageous when the single rotational oscillators oscillate at a relatively high frequency of 100 cycles or more. Also, by use of flexible wheel spokes a friction-free bearing of the rotational oscillator is possible. This favorably affects the frequency stability, the safety of the device, and its energy consumption.

In order to obtain an optimum of oscillation compensation according to the invention, it is provided that the product $Aw$ ($A$=moment of inertia of the concerned rotational oscillator around its oscillation axis, $w$=amplitude) for rotational oscillators of different oscillation systems is approximately equal in magnitude.

In this type of construction, the oscillators may be curved bending oscillators. The bending oscillator is formed so that the line of its oscillation impulse is straight. The optimum of oscillation compensation is obtained when the impulse lines of the two bending oscillators coincide.

An example of this construction is a bending oscillator mounted with both its longitudinal end pieces fixed on an appropriate mounting so that it oscillates along its cross central plane. A closed ring-shaped construction of the bending oscillator has proven favorable in which the oscillation plane corresponds to the ring plane.

Another embodiment of this invention uses two bending oscillators, each fixed to a common base at a distance from each other. The other ends of both oscillators are preferably free ends or, if necessary, clamped into a carrier. When both bending oscillators each have a free end piece, the carrier may be U-shaped. The oscillation occurs in the space between the oscillators. Both oscillators have the same impulse line because the carrier is formed so that, although they are oscillatory, they form piece parts of the concerned bending oscillator. Also for that purpose the profile of the cross section of the single oscillator can change continuously or suddenly over at least one longitudinal section, the change occurring preferably in the direction towards the free end piece.

In some cases it is preferable that at least one of the oscillation systems consists of two bending oscillators which have a common oscillation line and which are preferably excitable to out-of-phase oscillation. This out-of-phase oscillation provides at least a partial compensation of the system. The remaining forces are compensated by the oscillation of the other oscillation system. In that way an almost perfect oscillation compensation can be obtained. It is also possible to oscillate both bending oscillators of the two compensating oscillation systems in different frequencies so that a resultant modulated oscillation occurs which is compensated for by the oscillation of the other oscillation system, which may be constructed in the same manner. In another construction of this invention, both bending oscillators of each of the two oscillation systems are excitable to oscillations of equal frequency by using one tuning fork in each system and preferably both tuning forks are H-shaped. The symmetry center point of this oscillation arrangement is connected to the base and does not participate in their oscillation because of the shape of both tuning forks.

The present invention also provides diaphragm oscillators in which each of the oscillating systems in a diaphragm oscillator, the oscillators being similar and arranged on the same axis at a predetermined distance from each other. Each diaphragm may be clamped on two opposite spots of its circumference so that the distance between the clamps is greater than the average width of the diaphragm.

Until now, the invention had been described in connection with oscillation arrangements in which the oscillators are of the same type. However, this is by no means necessary to obtain oscillation compensation. In some cases, combinations of oscillators of different types may advantageously be provided. For example, one favorable construction includes one precision bending oscillator having a straight oscillation impulse action line and made of a special high-grade material, i.e. watch spring steel. The other oscillator in this example is a simple diaphragm oscillator which is approximately adjusted to the inherent oscillation frequency of the bending oscillator so that it makes forced oscillations in the rhythm of the oscillations of the bending oscillator. The diaphragm oscillator is relatively cheap and easy to make and serves only to compensate the oscillations of the precision oscillator. The time standard is delivered by the precision oscillator.

The impulse to the oscillation arrangement can be given in any appropriate manner. For example, one oscillator may be excitable by an impulse device and the other oscillator excited by being coupled with it. In this case the inherent oscillation frequency of the coupled oscillator is in phase opposition to the exteriorly impulsed oscillator.

In one preferred embodiment of the invention, at least two oscillators are oscillation excitable by separate exterior impulse devices. In this embodiment, both oscillators are impulsed independently from each other with the amplitude, frequency and phase necessary for the oscillation compensation. It can also be provided that at least two oscillators are oscillation excitable by a common impulse device. A suitable device is an electromagnet with at least one exciter coil. The exciter coil cooperates with opposite coils or ferromagnetic bodies to deliver the impulse. Permanent magnets are preferred as the ferromagnetic bodies.

The impulse device can be self-controlling, as is known in the art, so that the exciter current induced in the exciter coil is synchronized with the inherent oscillation frequency of one of the oscillators. The impulse device can also be constructed in other ways, for example so that the impulse device receives its control or regulation commands from a separate source. Such a separate source may be an appropriate oscillation generator.

In order to improve the oscillation compensation, an amplitude adjustment device is provided for the adjustment of at least one of the oscillators. For example, a suitable amplitude adjustment device is a limiting means which restricts the amplitude to a preset maximum range or peak. Depending on the quality of the desired compensation, the width of this maximum range can be larger or smaller. It has been shown that, in general, it is sufficient when the maximum range is not greater than 10–15% of the average amplitude. The amplitude means may be a flexible banking device or a contact-free device such as coils or magnets.

A preferred amplitude adjustment device can be adjusted to control various amplitudes of the oscillator.

In this arrangement the oscillation amplitude can be adjusted without changing the form of oscillation.

In order to synchronize the inherent frequencies of the two oscillators, at least one of the oscillators has an adjustment means for the adjustment of its inherent frequency. The same adjustment means can also be used for the adjustment of the time standard of the timekeeping device.

In the known timekeeping devices, the oscillation arrangement is relatively light compared with the base, in order to keep the coupling between the oscillation arrangement and the base within tolerable limits. By using the present invention, the moment of inertia of the oscillators can be chosen independently from the mass (moment of inertia) of the base.

The present invention permits one to choose the optimum oscillator without consideration of the mass of the base. In portable watches, e.g. wrist watches, a heavier oscillation arrangement having good frequency stability can be used by employing the present invention than in the previous constructions of this type. The mass (moment of inertia) of the base can be chosen so that it corresponds to stability specifications or any other constructive conditions. In case of a present total weight or a preset outer dimension of the timekeeping device, the frequency stability can still be high because the moment of inertia of a single oscillator is at least equal in magnitude, and preferably greater, than the moment of inertia of the base.

Another disadvantage of the conventional type of U-shaped tuning fork, when used in watches, is that it is orientationally dependable since the vibrating masses move in arcs. The reflecting momentum of the tines will then by gravity be increased or decreased depending on its orientation at times. By means of tuning forks in the shape of a W, O or H, the tuning fork frequency can theoretically be made independent from orientation. This was reported on in the periodical "Technische Rundschau" 19, April 26, 1963, page 41, Editor: Halwag Verlag, Bern, Switzerland. However, such tuning forks produce a relatively high rate inaccuracy because the fork tines are relatively thin in the direction of the wanted vibration when the tines are enabled to make rotative vibrations in their longitudinal axis. This impairs the rate accuracy or even excludes the use of such devices. In a frequency standard especially for timekeeping devices, in accordance with this invention, a vibration system has at least one mechanical vibrator which can be excited to vibrations by a vibration impulse in which the partial vibrators having each two spokes, are symmetrically arranged in one level and the nodal point being above the symmetry level, is fixed on a base. At times one middle point of the partial vibrators makes an at least approximately straight lined vibration and the vibrations are in oppositely directed couples for compensation. At least two vibrators are provided in a distance from each other of which the elasticity constant in the wanted vibration orientation is essentially lower than in the other orientations. The partial vibrators are connected to each other by rigid connection parts to partial vibration systems in such a manner that the centers of gravity of the partial vibration systems vibrate straight lined and in oppositely directed couples. By the straight lined motion of the centers of gravity, the frequency of the frequency standard becomes independent of the orientation of the vibrator. It had been proven as especially advantageous when the partial vibrators of each vibrator are arranged perpendicular to their vibration direction and next to each other. By such an arrangement not only the production of the vibrator will be easier but also an especially compact construction of the vibration system is possible. Generally it is especially advantageous when the partial vibrators of at least one vibrator are arranged in series in the vibration direction. By such an arrangement it can be obtained in a very simple constructive manner that the centers of gravity of all partial vibrating systems vibrate at least approximately in a common straight line. According to the invention, such a location of the centers of gravity of all partial vibrating systems is preferably provided in a common straight line since by that an extraordinary high rate accuracy will be obtained.

The drawings show various forms of execution of the invention. In the drawings.

In order to simplify the drawings, the corresponding parts have the same reference numbers in all the figures.

Figures 1, 2:
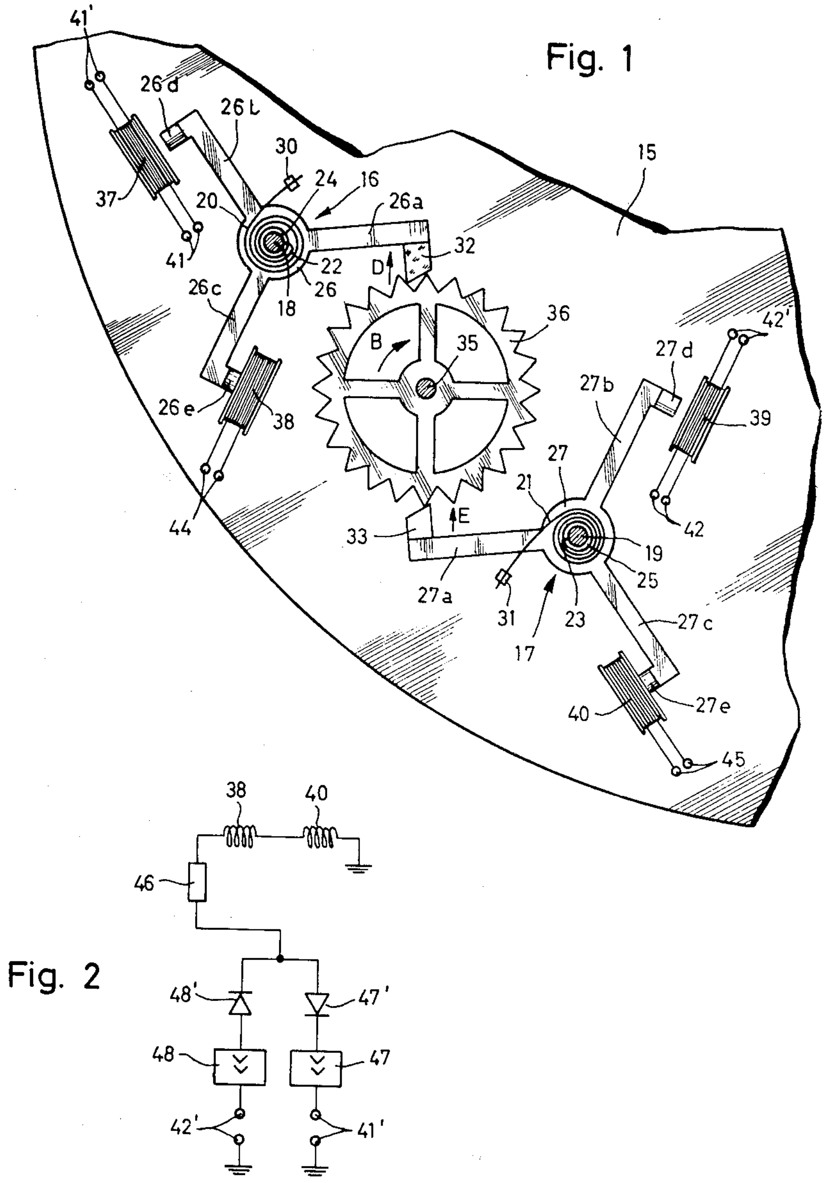
FIG. 1 is a top plan view of an oscillation system according to the present invention in which parts of the frame are broken off and all components of the time-keeping devices not necessary for understanding of the invention are omitted.
FIG. 2 is a circuit diagram of an amplitude adjustment device that can be used with the oscillating system according to FIG. 1.

In the form of execution according to FIG. 1, upon a frame plate 15 at a fixed distance from each other, two star-shaped rotational oscillators 16 and 17 are rotatably mounted on axes 18 and 19, respectively. The hairsprings 20 and 21, respectively, provide rotational movement to the oscillators. One of the ends 22 and 23, respectively, of these hairsprings are embedded in a ring flange 24 and 25 on the oscillator body 26 and 27, respectively. Each oscillator has three spokes *26a*, *26b* and *26c* of oscillator 26, and *27a*, *27b* and *27c* of oscillator 27. The other ends of the hairsprings 20 and 21, respectively, are clamped in two holds 30 and 31, respectively, which are fixed on the plate. On each of the spokes *26a* and *27a* a step jewel 32 and 33, respectively, is fixed, which causes the impulse of the gear (escape) wheel 36 in direction of the arrow B. This gear wheel is arranged on the axis 35 which is fixed on the frame 15. The gear wheel 36 is the entrance wheel of a gear train which is arranged on the frame 15, the gear train being conventional and not shown.

Four coils 37, 38, 39 and 40 are fixed on the frame 15. These coils cooperate with the end pieces *26d*, *26e*, *27d* and *27e* on the ends of spokes *26b*, *26c*, *27b* and *27c*, respectively, which pieces are permanent magnets. The coils 37 and 39 each have two windings, their terminals being 41 and 41′ and 42 and 42′, respectively. The windings which are connected to the terminals 41 and 42 are the exciter windings which cause impulse of the magnets. The windings connected to the terminals 41′ and 42′ are amplitude control windings for controlling the magnitude of the oscillator's amplitudes. The corresponding circuit is shown in FIG. 2. The coils 38 and 40, with their terminals 44 and 45, respectively (FIG. 1) are induction coils in which voltages are induced by the permanent magnetic end pieces *26c* and *27e*, respectively. The voltages correspond to the oscillations of the rotational oscillators 16 and 17. In the circuit of FIG. 2, coils 38 and 40 are in opposite circuits so that the induced voltages are at any time in opposite directions. The exciter coils, which are connected to the terminals 41 and 42, are excitable in phase so that the rotational oscillators 16 and 17 oscillate and cause the voltages induced in the coils 38 and 40 to be opposed in phase. As long as the rotational amplitude of the oscillators 16 and 17 are equal, the voltages induced in the coils 38 and 40 will be equal and therefore no voltage drop will occur across the resistor 46. However, when the rotational oscillators have different amplitudes, a voltage drop occurs across resistor 46. The polarity of the voltage drop depends upon which of the oscillators 16 or 17 oscillates with the greater amplitude. A voltage is impressed on one or the other of amplifiers 47 and 48 over their rectifiers 47′ and 48′, respectively. The voltage is amplified and impressed to the amplitude control winding connected to the amplifier. The excitement of this amplitude control winding causes an attenuation of the magnetic field created by the winding and therefore limits the amplitude of its oscillator to values approximately that of the other oscillator. The amplitude adjustment device shown in this form of construction is only an example of the type of device which may be used.

As is shown by the arrows D and E, the motion of the step jewels 32 and 33 is coordinated. Both step jewels alternate periodically to drive the gear wheel 36. When both step jewels 32 and 33 oscillate in the direction of the arrows D and E, the motion of the step jewel 33 causes rotation of the gear wheel 36 for one part of a circular pitch. When the oscillation direction is opposite, the step jewel during its half oscillation shifts the gear wheel 36 for the remaining part of this circular pitch. This operation is periodically repeated with each full oscillation of both rotational oscillators 16 and 17. With this kind of stepping and the proper shape of step jewels and teeth of the gear wheel 36, a more or less uniform drive of this gear wheel is possible. Using an appropriate magnitude of the oscillation amplitudes of both oscillators 16 and 17 and an appropriate tooth and step jewel shape, the motion of the gear wheel 36 is practically uniform. In many cases this may be a considerable advantage.

Figure 3:
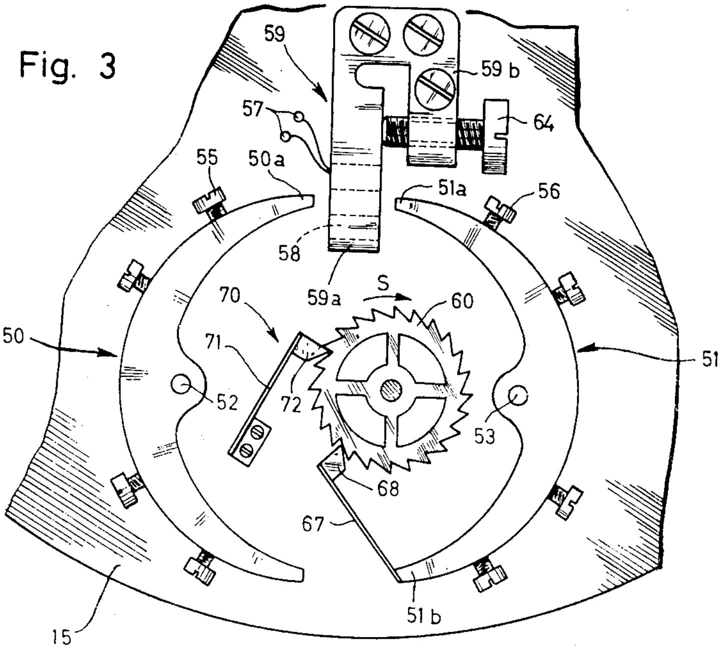
FIG. 3 is a top plan view of another form of construction of the invention.

In the form of construction shown in FIG. 3, two sickle-shaped rotational oscillating bodies 50 and 51 are mounted on torsion bars 52 and 53, respectively, and the bars strongly clamped to the frame 15. Four screws 55 and 56 are positioned on each of the rotational oscillation bodies 50 and 51 to serve for poising and adjustment of their inherent oscillation frequency. The impulse of both rotational oscillation bodies 50 and 51 for rotational oscillations is given by a common impulse device 59. In order to simplify the drawing, only the exciter coil 58 of this impulse device 59 is indicated. This exciter coil has terminals 57. The exciter coil is concentrically arranged between the free end pieces of the rotational oscillation bodies *50a* and *51a*, which pieces consist of ferromagnetic material. The coil is fixed on one carrier arm *59a* whose exact location between both the free end pieces *50a* and *51a* is adjustable by the adjustment screws 64 and the mounted adjustment carrier *59b*. This adjustment device exactly adjusts the amplitudes of the rotational oscillations of both rotational oscillation bodies 50 and 51 to a present amount. In the present example the adjustment is for equal amplitudes of both oscillations. A switch arm 67 is positioned on the free end piece *51b* of the rotational oscillation body 51 and a step jewel 68 is fixed on the free end of the arm. The gear wheel 60 is driven in the rhythm of the oscillations of the rotational oscillation body 51 in the direction of the arrow S by means of this switch arm and its step jewel. A braking device 70 is fixed on frame 15 and consists of a flexible arm 71 and a braking jewel 72, the braking device preventing a turn-back of the gear wheel 60 on the return motion of the switch arm 67. Since this gear wheel brake and pawl are of the conventional type, they are not further explained.

In the forms of construction according to FIGS. 1 and 3, the single rotational oscillation bodies are arranged at a distance from each other on the frame and each transmits its own reactional rotation moments to the frame so that the frame would be affected by rotation moments. However, the rotational oscillators assigned to each other are arranged and excitable to oscillation of such an amplitude that the rotation moments (forces) transmitted from them compensate each other so that the frame remains inactive.

Figure 4:
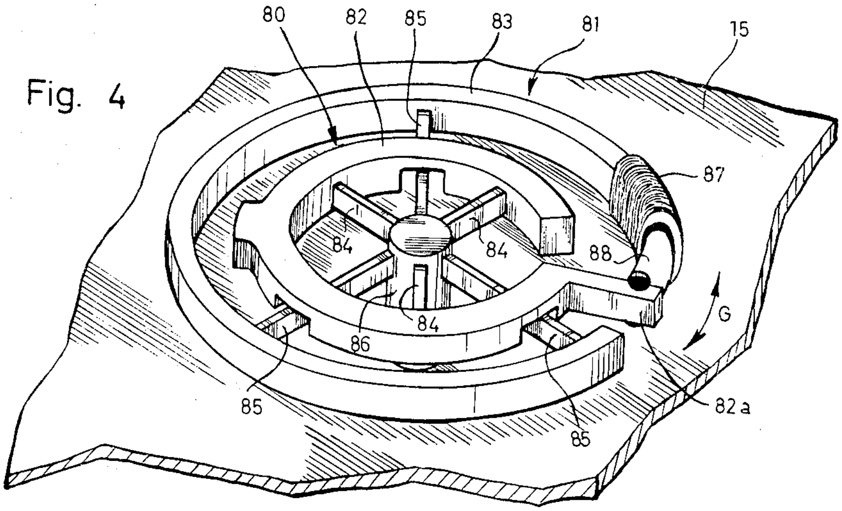
FIG. 4 is a perspective view of an oscillating system with two out-of-phase rotational oscillators, in which, to simplify the drawing, the stepping device is omitted.

When it is preferred to use rotational oscillators as oscillators of the oscillation system, the arrangement of FIG. 4 is suitable. In this form of construction, each rotational oscillator 80 and 81 includes a rotational symmetrical outer ring 82 and 83, respectively. The outer rings are fixed by means of spokes 84 and 85, respectively, the spokes being bending springs fixed on the central carrier 86 and the carrier fixed on the frame 15. These rotational oscillators 80 and 81 oscillate rotationally in the direction of the double arrow G in a common plane whereby the direction moments which create these oscillations are created by bending of the spokes 84 and 85. This rotational oscilliation arrangement is impulsed by excitment of the exciter coil 87, the coil being fixed on outer ring 83 and cooperating with a permanent magnet 88 connected by the arm *82a* to the outer ring 82.

In the form of construction according to FIG. 4, the rotational oscillators can be so that their moments of inertia are equal. The moment of inertia of the rotational oscillator 80 is essentially smaller than the moment of inertia of the rotational oscillator 81. In order to obtain the maximum oscillation compensation, the impulse device is arranged so that the ratio of the oscillation amplitudes satisfies the following equation:

$$\frac{w_1}{w_2}=\frac{A_2}{A_1} \quad (1)$$

where $w_1$=oscillation amplitude of the rotational oscillator 80,
$w_2$=oscillation amplitude of the rotational oscillator 81,
$A_1$=moment of inertia of the rotational oscillator 80,
$A_2$=moment of inertia of the rotational oscillator 81.

Equation 1 can, for instance, be satisfied when $$n_1=n_2 \quad (2)$$

where $n_1$=inherent oscillation frequency of the rotational oscillator 80, and
$n_2$=inherent oscillation frequency of the rotational oscillator 81.

Since the inherent oscillation frequency is essentially determined by the spring constant of the spokes 84 and 85, Equation 2 can be satisfied by an appropriate proportionment of these spokes.

It is advantageous that both rotational oscillators 80 and 81 oscillate around a common axis and have a common oscillation plane, but this is by no means a necessary condition. According to the invention, both rotational compensating oscillators may be arranged at a distance from each other on the same axis but in different planes of oscillation and no resultant rotation moment will be exerted on the frame.

Figure 5:
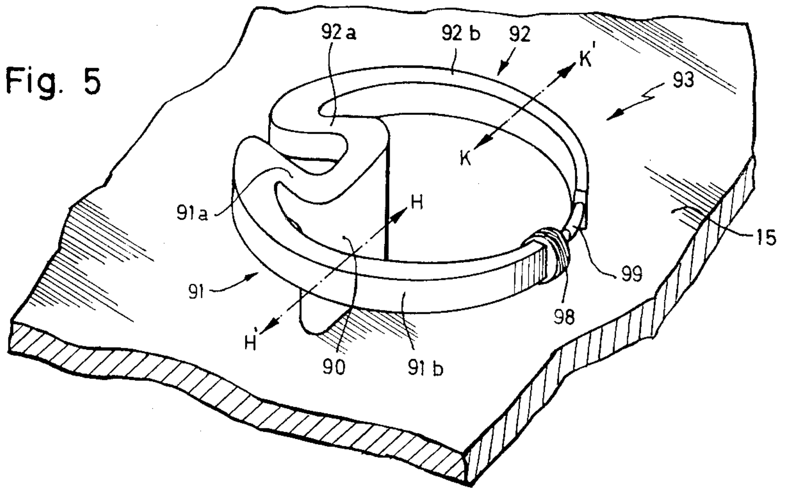
FIG. 5 is a perspective drawing of another form of construction of the invention in which two bending oscillators are arranged on a common carrier.

In the embodiment shown in FIG. 5, the oscillation arrangement 93 is in the form of a horseshoe. Two bending oscillators 91 and 92 are fixed as part of a one-piece arrangement on a center piece 90, with the center piece 90 fixed to frame 15. The inner end pieces *91a* and *92a* of both bending oscillators 91 and 92 bent inward and are integral with the bow-shaped piece parts *91b* and *92b* of these oscillators so that their impulse action lines H–H′ and K–K′ are essentially straight and coincide. The impulse device has an exciter coil 98 which cooperates with a permanent magnet 99. These impulse components are fixed on the front faces, which are opposite to each other and parallel, of bending oscillators 91 and 92, respectively.

Figure 6:
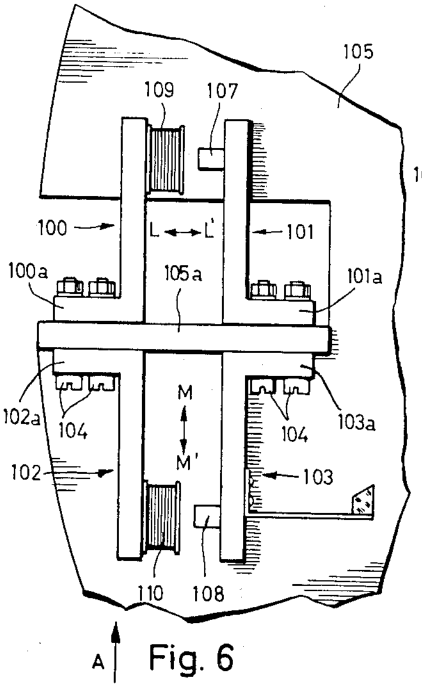
FIG. 6 is a top plan view of another form of construction of the invention.
Figure 7:
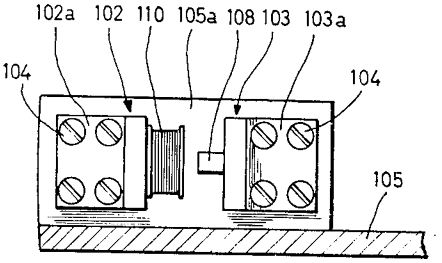
FIG. 7 is a side plan view of the oscillation system according to FIG. 6, taken in direction of the arrow A.

The form of construction shown in FIGS. 6 and 7 includes four single and straight bending oscillators 100, 101, 102, 103. These bending oscillators have their bent end pieces *100a*, *101a*, *102a*, *103a* fixed by screws 104 on the upwards bent portions *105a* of the frame 105. The bending oscillators 100 and 101 and the oscillators 102 and 103 each are an oscillation system. Both bending oscillators of each of those oscillation systems are arranged so that they are impulsed by the coils 109 and 110, respectively, which cooperate with the permanent magnet 107 and 108, so that at times their reaction moments (direction M–M′) and reaction forces (direction L–L′) are compensating each other.

The reaction moments are in the oscillation direction M–M′ perpendicular to the oscillation direction L–L′ and are compensated because both oscillation systems are equal in shape and are symmetrically arranged to each other.

Figures 8, 9:
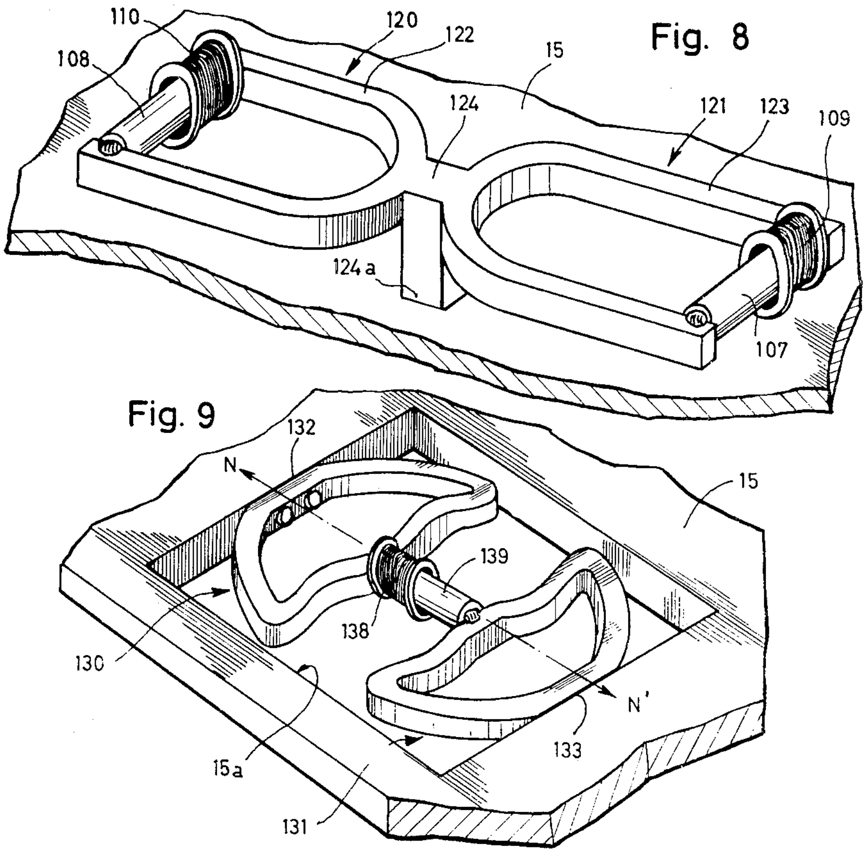
FIG. 8 is a perspective drawing of another form of construction of the invention which is similar to the form of construction according to FIGS. 6 and 7.
FIG. 9 is a perspective drawing of another oscillation arrangement according to the invention.

In the form of construction of FIG. 8 is shown a variant of the form of construction of FIGS. 6 and 7, so that the conditions are similar as in FIGS. 6 and 7. In FIG. 8 both oscillation systems 120 and 121 each have a tuning fork 122 and 123. These tuning forks are connected with each other by an intermediate part 124. This intermediate piece is the symmetry center point of the oscillation arrangement and therefore stays relatively quiet. The lower end *124a* of the intermediate piece 124 is fixed on the frame 15.

In the form of construction of FIG. 9, two ring-shaped closed bending oscillators 130 and 131 are arranged in a rectanguar opening *15a* of the frame 15, and the bending oscillators 130 and 131 are rigidly fixed on the frame by portions 132 and 133 respectively. The bending oscillator 130 has on its front face a concentrically arranged exciter coil 138 and the other bending oscillator 131 has a permanent magnet 139 which cooperates with this coil and is similarly arranged. Both bending oscillators have a common oscillating plane and are symmetrically arranged so that their oscillation impulse action lines are located on their common center line N–N′.

Figure 10:
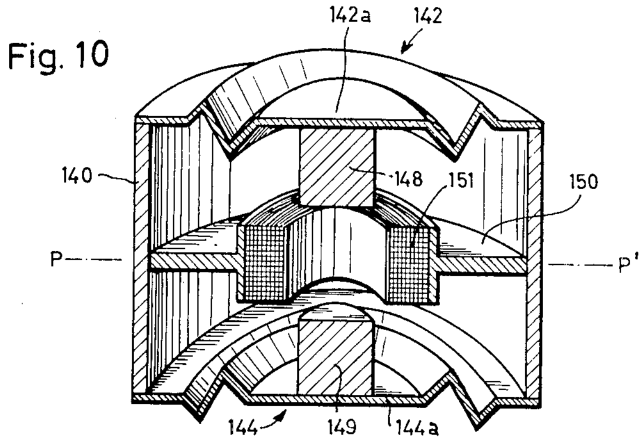
FIG. 10 is a perspective view of a section of a rotational symmetrical diaphragm oscillation arrangement.

FIG. 10 shows a diaphragm oscillating system which is closed in itself. This oscillating system is symmetrically built in respect to a central symmetry plane called P–P′.

Figure 11:
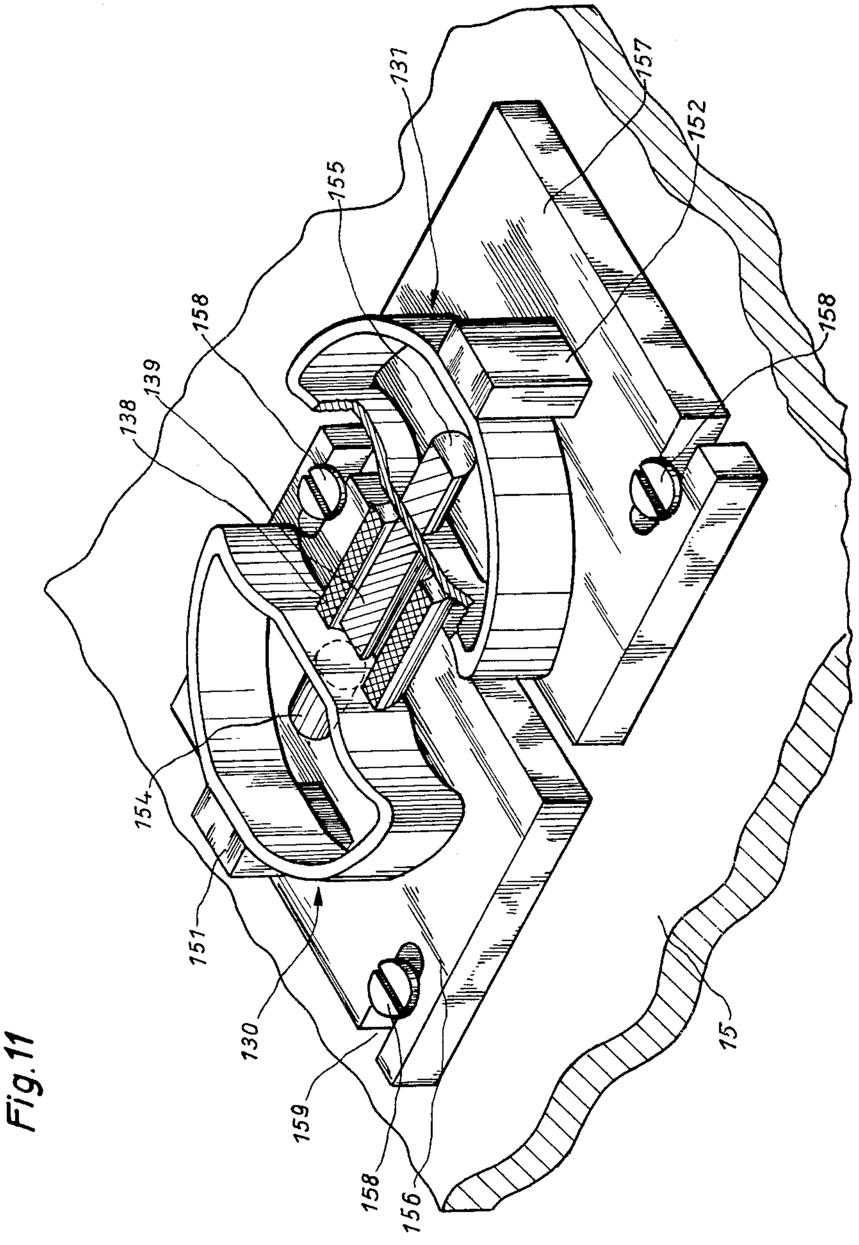
FIG. 11 is a perspective view of a form of construction similar to that of FIG. 9.
Figure 12:
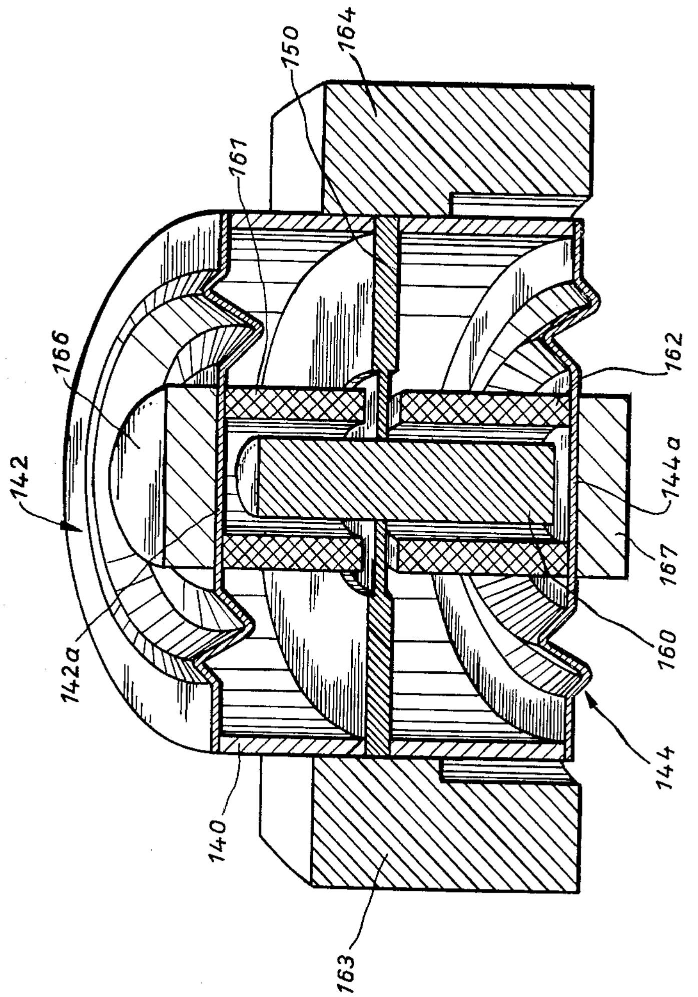
FIG. 12 is a perspective cut-away view of an oscillating arrangement using two diaphragm oscillators.
Figure 13:
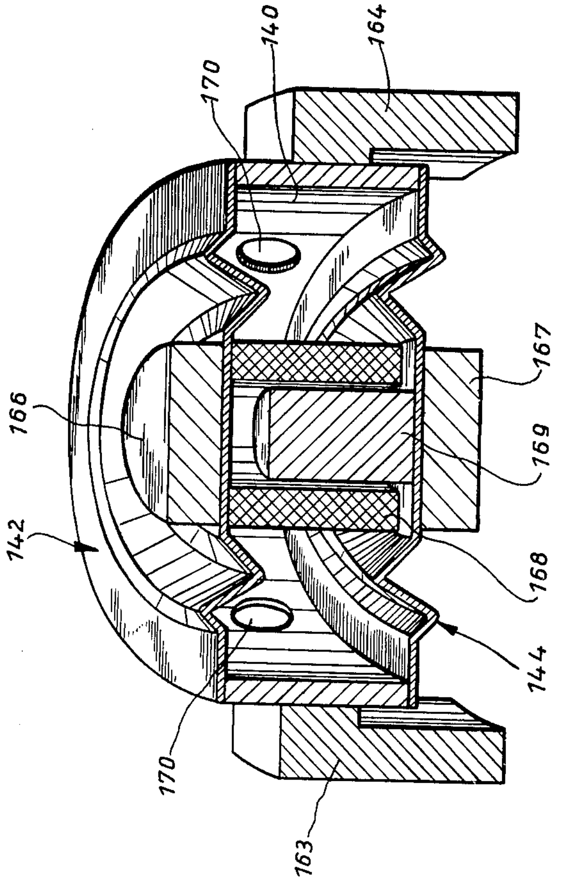
FIG. 13 is a perspective cut-away view of a variation of the embodiment of FIG. 12.
Figure 14:
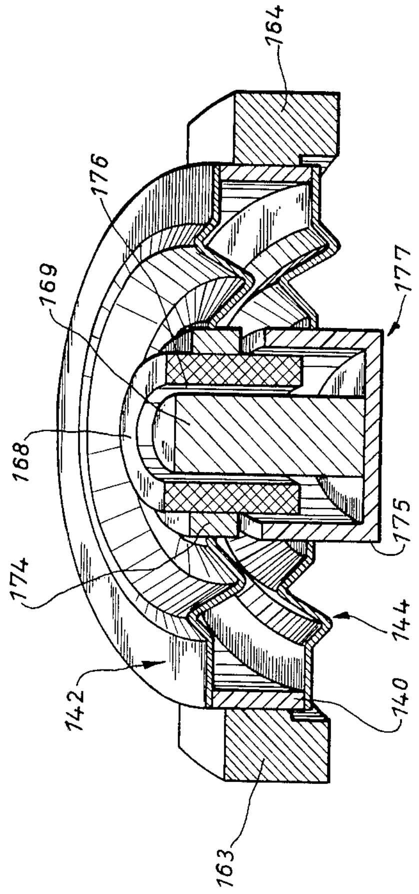
FIG. 14 is a perspective cut-away view of another variation of the embodiment of FIG. 12.
Figure 15:
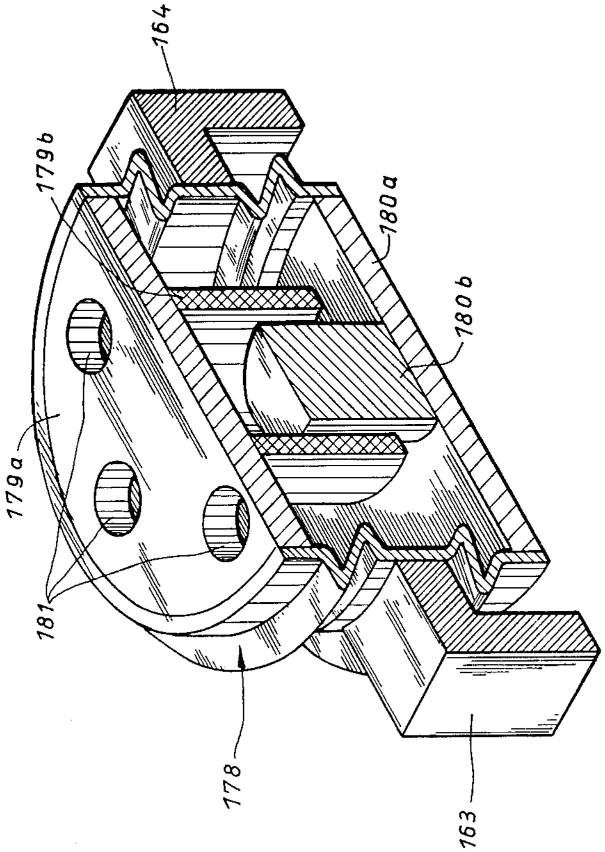
FIG. 15 is a perspective cut-away view of an oscillating arrangement in which the side walls oscillate.
Figure 16:
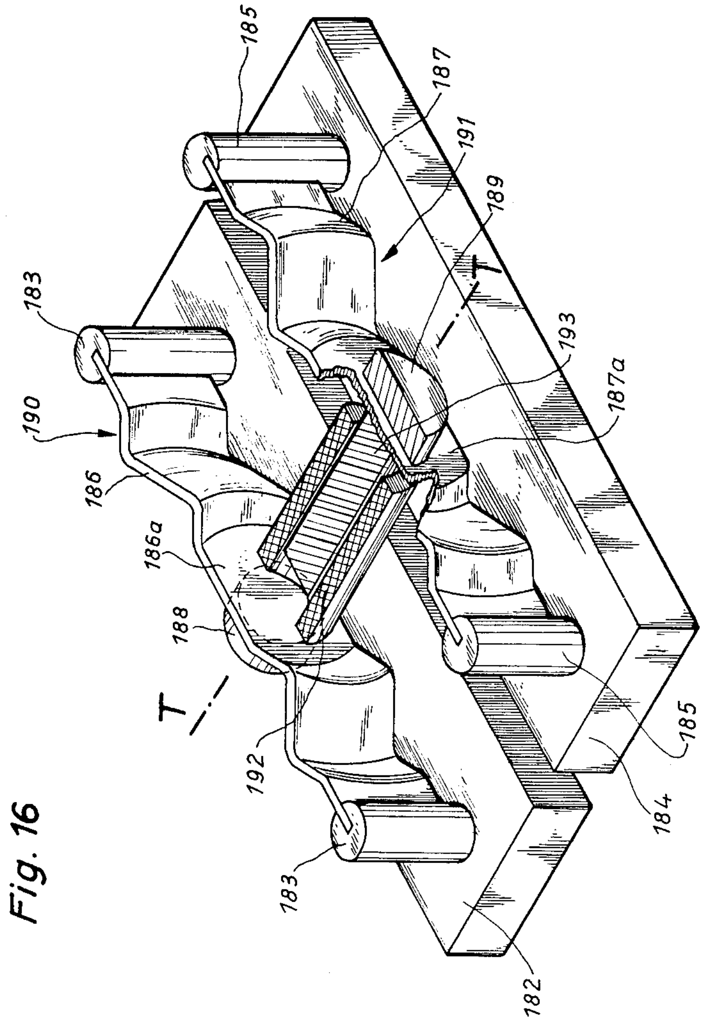
FIG. 16 is a perspective view, partially cut away, of another form of oscillating arrangement.
Figure 17:
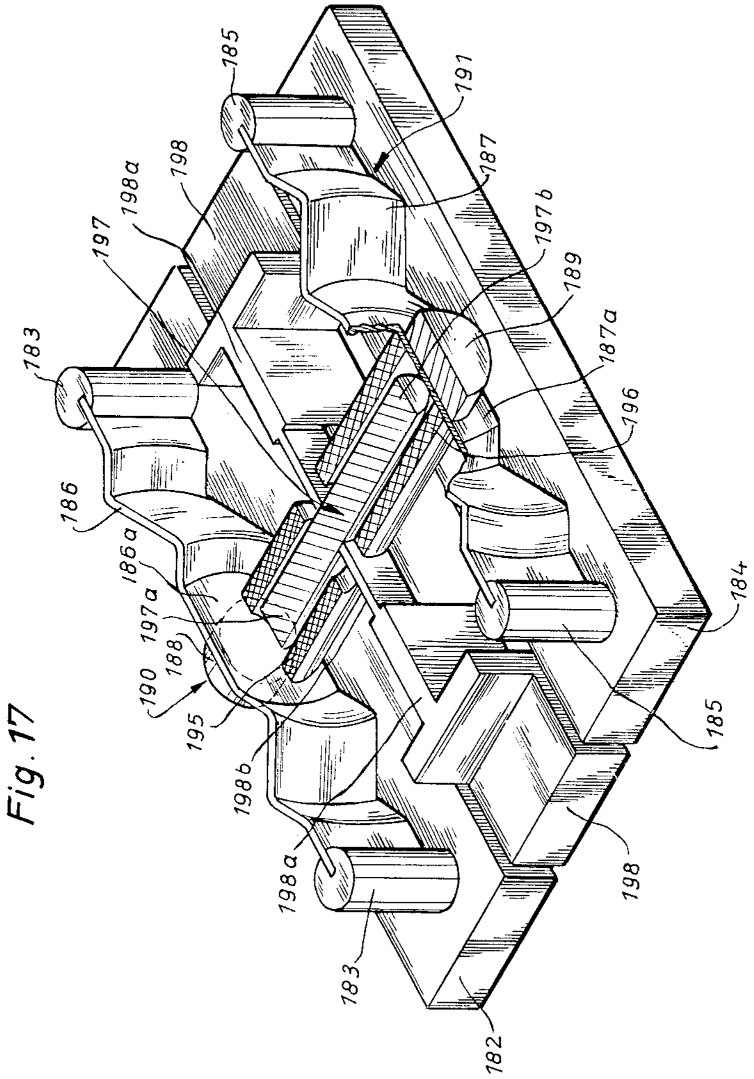
FIG. 17 is a perspective view, partially cut away, of a variation of the embodiment of FIG. 16.
Figure 18:
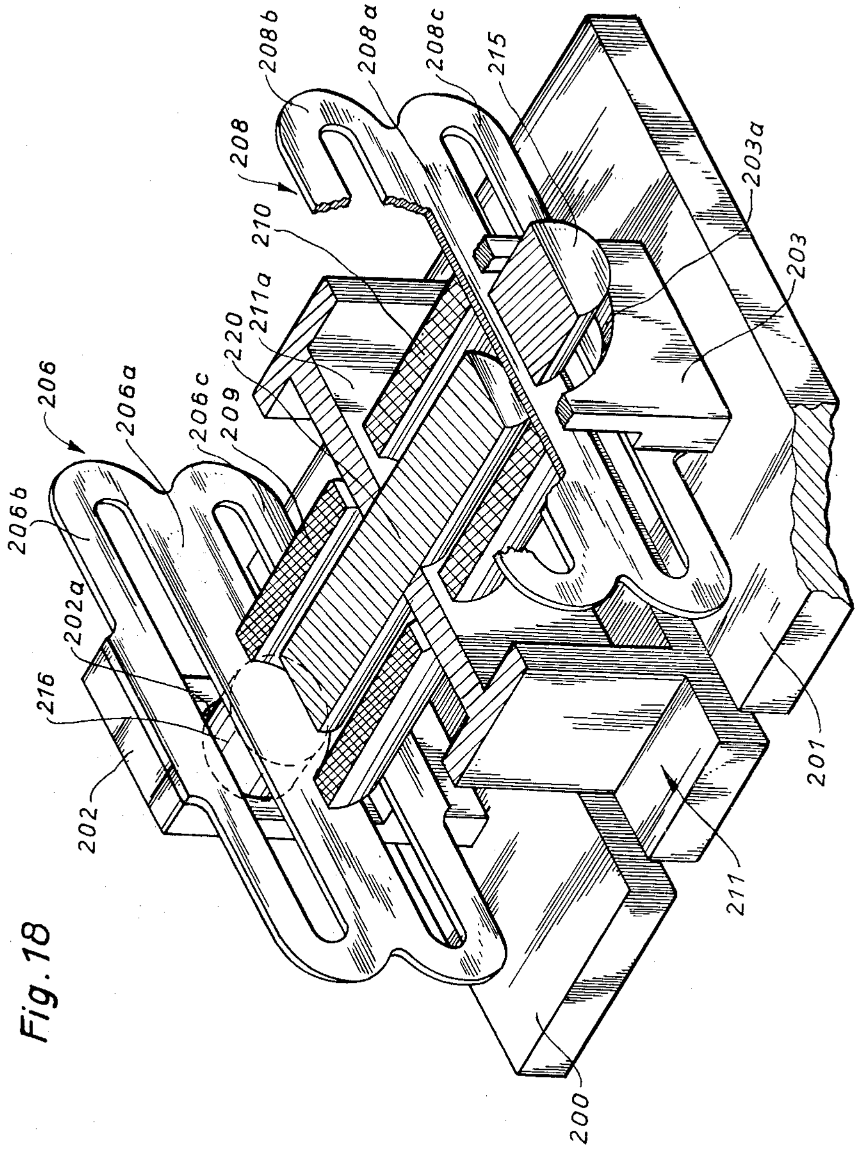
FIG. 18 is a perspective view, partially cut away, of another form of construction of the present invention.
Figure 19:
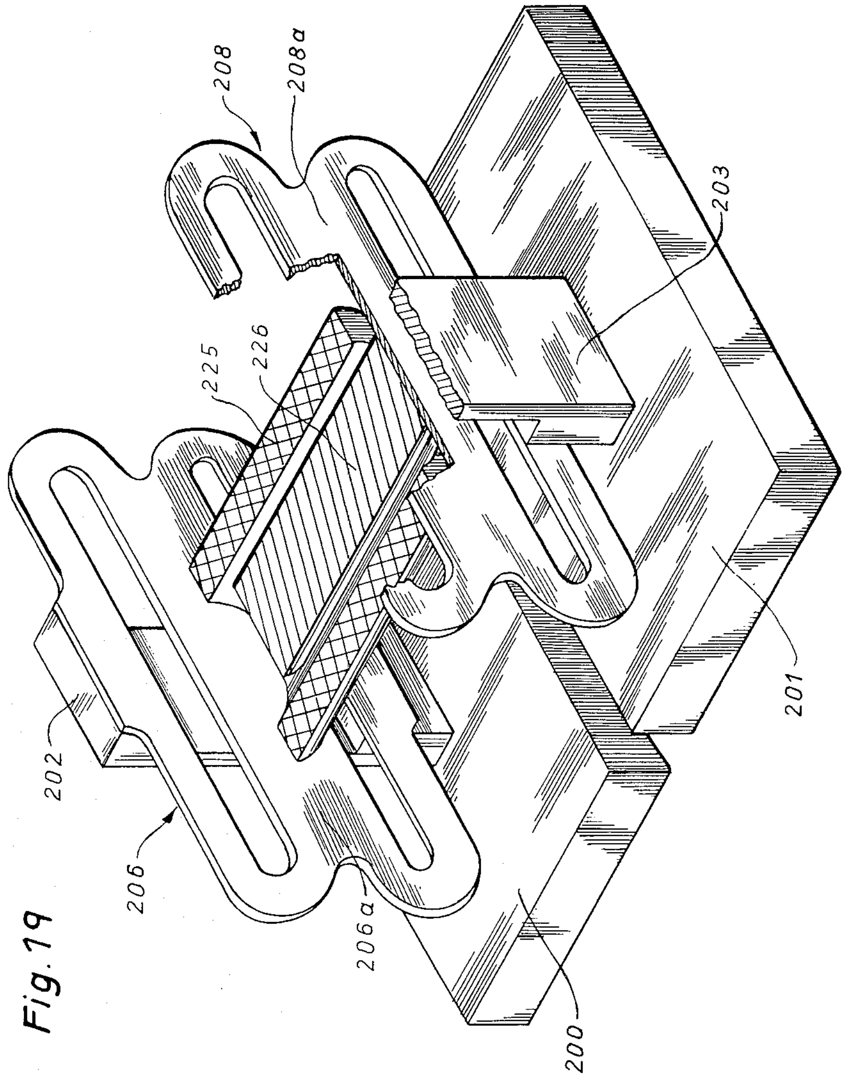
FIG. 19 is a perspective view, partially cut away, of a construction similar to that of FIG. 18.
Figure 20:
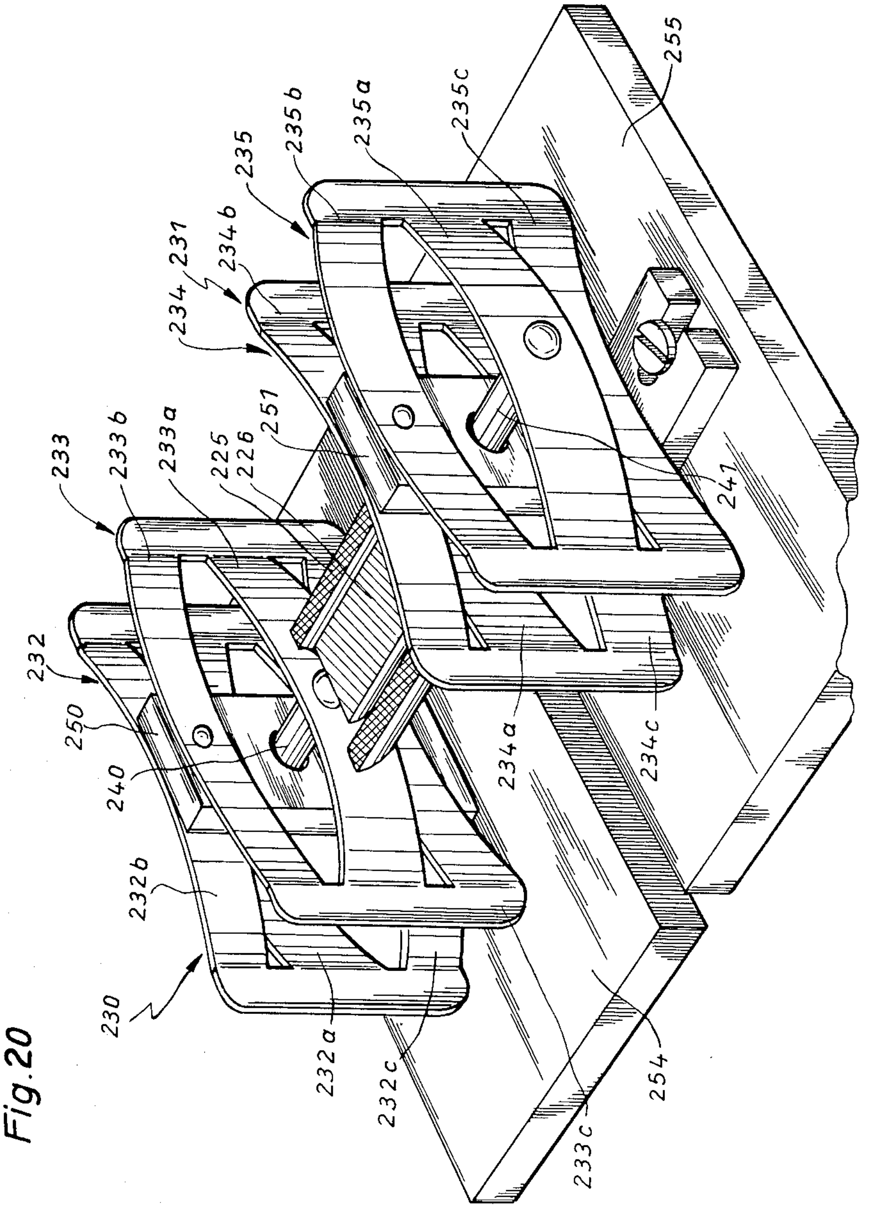
FIG. 20 is a perspective view, partially cut away, of a form of construction utilizing four bending portions.
Figure 21:
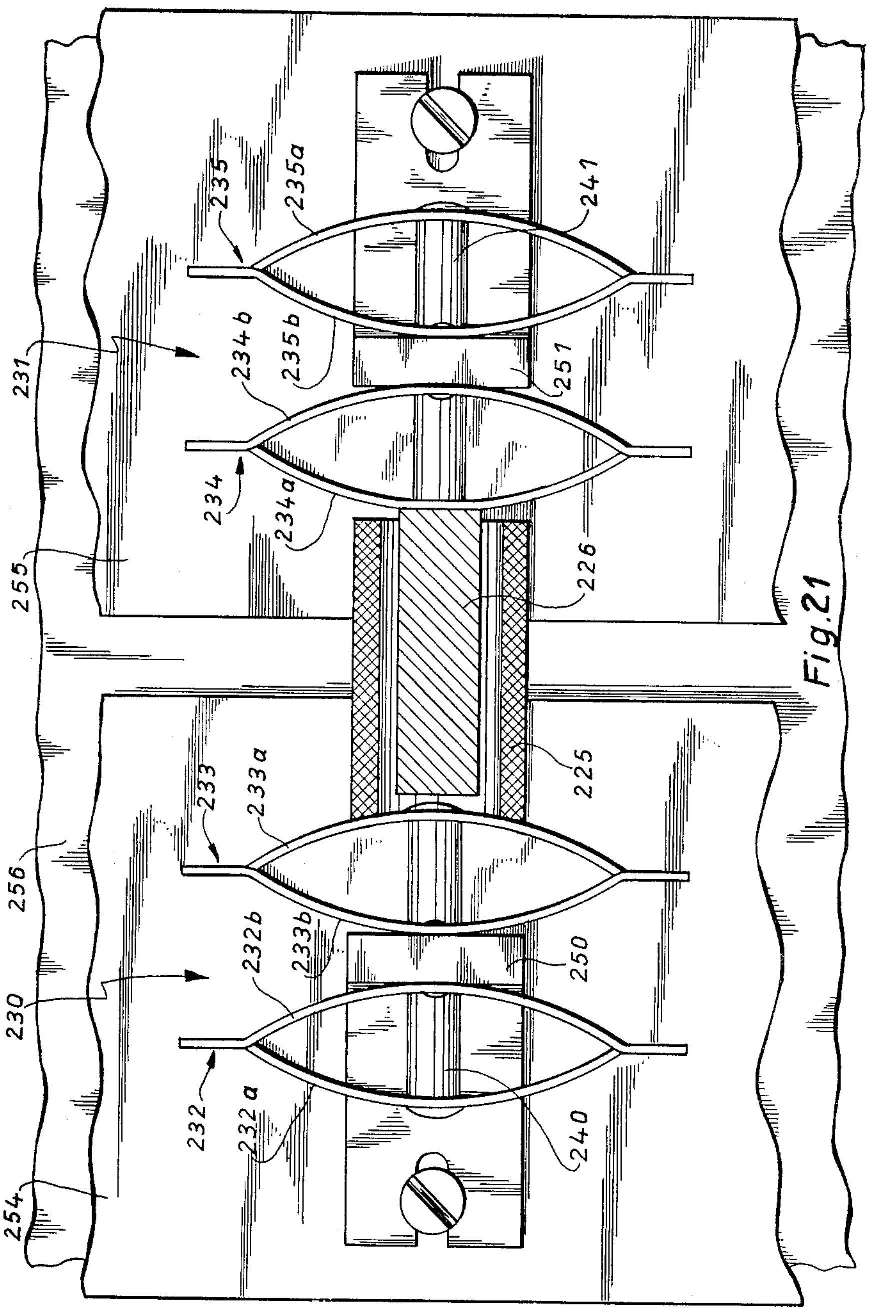
FIG. 21 is a top plan view, partially cut away, of the embodiment of FIG. 20.
Figure 22:
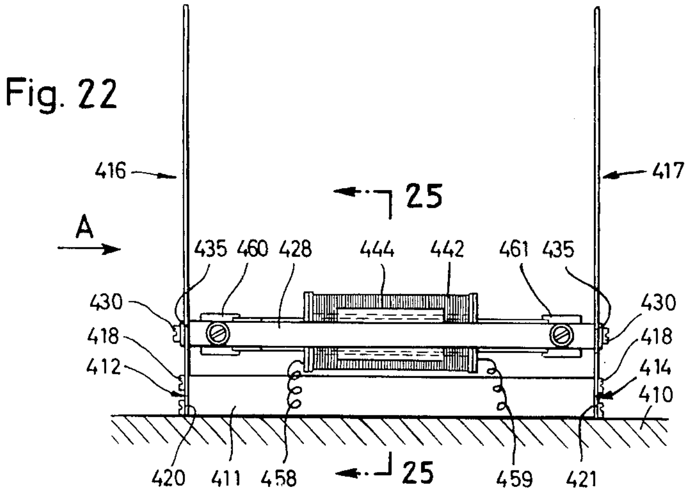
FIG. 22 is a side view of a first vibrating system according to the invention.
Figure 23:
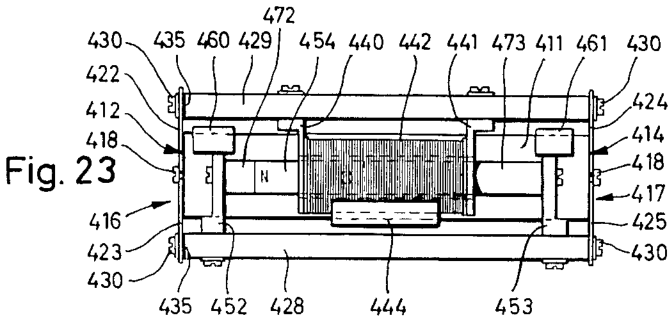
FIG. 23 is a top view of the vibrating system according to FIG. 22.
Figures 24, 25:
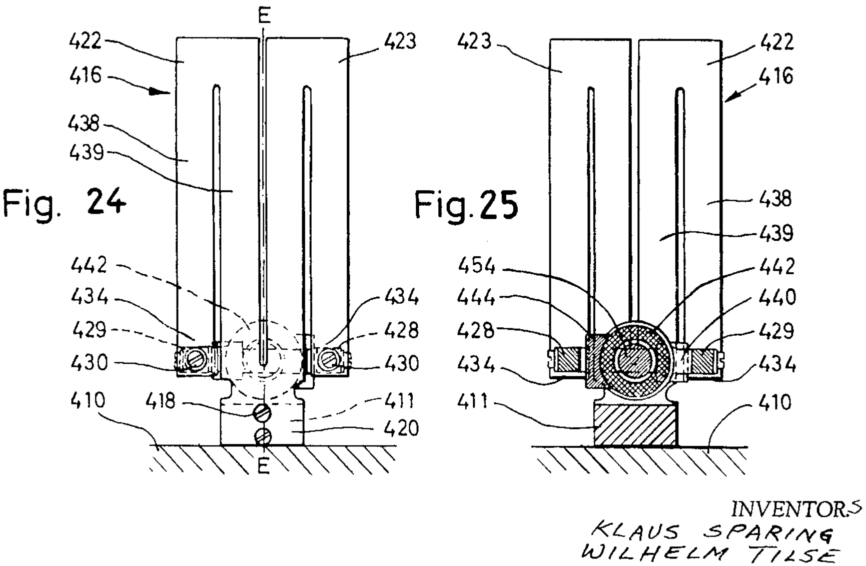
FIG. 24 is a front view in the direction of the arrow A of the vibrating system according to FIGS. 22 and 23.
FIG. 25 is a section referring to the lines 4—4 of FIG. 22.
Figure 26:
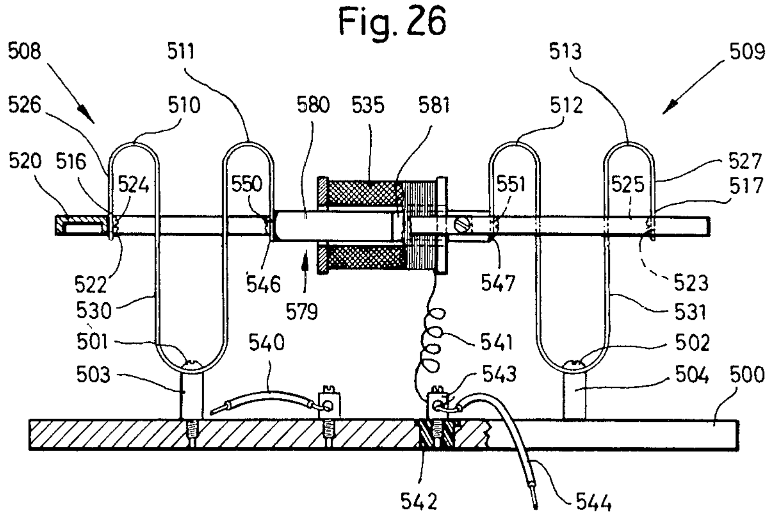
FIG. 26 is a side view of another preferred vibration system, according to the invention, whereby for clearer demonstration several parts are broken off.
Figure 27:
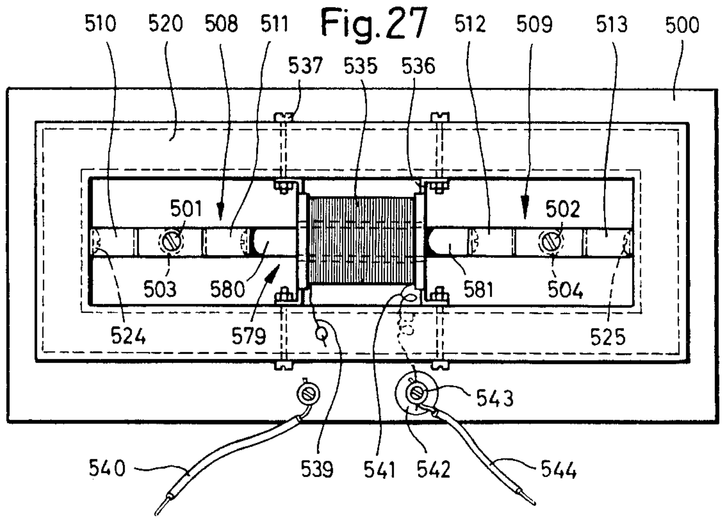
FIG. 27 is a top view of the vibrating system according to FIG. 26.

The drawings show various forms of execution of the invention. In the drawings:

FIG. 1 is a top plan view of an oscillation system according to the present invention in which parts of the frame are broken off and all components of the timekeeping devices not necessary for understanding of the invention are omitted;

FIG. 2 is a circuit diagram of an amplitude adjustment device that can be used with the oscillating system according to FIG. 1;

FIG. 3 is a top plan view of another form of construction of the invention;

FIG. 4 is a perspective view of an oscillating system with two out-of-phase rotational oscillators, in which, to simplify the drawing, the stepping device is omitted;

FIG. 5 is a perspective drawing of another form of construction of the invention in which two bending oscillators are arranged on a common carrier;

FIG. 6 is a top plan view of another form of construction of the invention;

FIG. 7 is a side plan view of the oscillation system according to FIG. 6, taken in direction of the arrow A;

FIG. 8 is a perspective drawing of another form of construction of the invention which is similar to the form of construction according to FIGS. 6 and 7;

FIG. 9 is a perspective drawing of another oscillation arrangement according to the invention;

FIG. 10 is a perspective view of a section of a rotational symmetrical diaphragm oscillation arrangement;

FIG. 11 is a perspective view of a form of construction similar to that of FIG. 9;

FIG. 12 is a perspective cut-away view of an oscillating arrangement using two diaphragm oscillators;

FIG. 13 is a perspective cut-away view of a variation of the embodiment of FIG. 12;

FIG. 14 is a perspective cut-away view of another variation of the embodiment of FIG. 12;

FIG. 15 is a perspective cut-away view of an oscillating arrangement in which the side walls oscillate;

FIG. 16 is a perspective view, partially cut away, of another form of oscillating arrangement;

FIG. 17 is a perspective view, partially cut away, of a variation of the embodiment of FIG. 16;

FIG. 18 is a perspective view, partially cut away, of another form of construction of the present invention;

FIG. 19 is a perspective view, partially cut away, of a construction similar to that of FIG. 18;

FIG. 20 is a perspective view, partially cut away, of a form of construction utilizing four bending portions;

FIG. 21 is a top plan view, partially cut away, of the embodiment of FIG. 20;

FIG. 22 is a side view of a first vibrating system according to the invention;

FIG. 23 is a top view of the vibrating system according to FIG. 22;

FIG. 24 is a front view in the direction of the arrow A of the vibrating system according to FIGS. 22 and 23;

FIG. 25 is a section referring to the lines 4—4 of FIG. 22;

FIG. 26 is a side view of another preferred vibration system, according to the invention, whereby for clearer demonstration several parts are broken off; and FIG. 27 is a top view of the vibrating system according to FIG. 26.

In order to simplify the drawings, the corresponding parts have the same reference numbers in all the figures.

In the form of execution according to FIG. 1, upon a frame plate 15 at a fixed distance from each other, two star-shaped rotational oscillators 16 and 17 are rotatably mounted on axes 18 and 19, respectively. The hairsprings 20 and 21, respectively, provide rotational movement to the oscillators. One of the ends 22 and 23, respectively, of these hairsprings are embedded in a ring flange 24 and 25 on the oscillator body 26 and 27, respectively. Each oscillator has three spokes *26a*, *26b* and *26c* of oscillator 26, and *27a*, *27b* and *27c* of oscillator 27. The other ends of the hairsprings 20 and 21, respectively, are clamped in two holds 30 and 31, respectively, which are fixed on the plate. On each of the spokes *26a* and *27a* a step jewel 32 and 33, respectively, is fixed, which causes the impulse of the gear (escape) wheel 36 in direction of the arrow B. This gear wheel is arranged on the axis 35 which is fixed on the frame 15. The gear wheel 36 is the entrance wheel of a gear train which is arranged on the frame 15, the gear train being conventional and not shown.

Four coils 37, 38, 39 and 40 are fixed on the frame 15. These coils cooperate with the end pieces *26d*, *26e*, *27d* and *27e* on the ends of spokes *26b*, *26c*, *27b* and *27c*, respectively, which pieces are permanent magnets. The coils 37 and 39 each have two windings, their terminals being 41 and 41′ and 42 and 42′, respectively. The windings which are connected to the terminals 41 and 42 are the exciter windings which cause impulse of the magnets. The windings connected to the terminals 41′ and 42′ are amplitude control windings for controlling the magnitude of the oscillator's amplitudes. The corresponding circuit is shown in FIG. 2. The coils 38 and 40, with their terminals 44 and 45, respectively (FIG. 1) are induction coils in which voltages are induced by the permanent magnetic end pieces *26c* and *27e*, respectively. The voltages correspond to the oscillations of the rotational oscillators 16 and 17. In the circuit of FIG. 2, coils 38 and 40 are in opposite circuits so that the induced voltages are at any time in opposite directions. The exciter coils, which are connected to the terminals 41 and 42, are excitable in phase so that the rotational oscillators 16 and 17 oscillate and cause the voltages induced in the coils 38 and 40 to be opposed in phase. As long as the rotational amplitude of the oscillators 16 and 17 are equal, the voltages induced in the coils 38 and 40 will be equal and therefore no voltage drop will occur across the resistor 46. However, when the rotational oscillators have different amplitudes, a voltage drop occurs across resistor 46. The polarity of the voltage drop depends upon which of the oscillators 16 or 17 oscillates with the greater amplitude. A voltage is impressed on one or the other of amplifiers 47 and 48 over their rectifiers 47′ and 48′, respectively. The voltage is amplified and impressed to the amplitude control winding connected to the amplifier. The excitement of this amplitude control winding causes an attenuation of the magnetic field created by the winding and therefore limits the amplitude of its oscillator to values approximately that of the other oscillator. The amplitude adjustment device shown in this form of construction is only an example of the type of device which may be used.

As is shown by the arrows D and E, the motion of the step jewels 32 and 33 is coordinated. Both step jewels alternate periodically to drive the gear wheel 36. When both step jewels 32 and 33 oscillate in the direction of the arrows D and E, the motion of the step jewel 33 causes rotation of the gear wheel 36 for one part of a circular pitch. When the oscillation direction is opposite, the step jewel during its half oscillation shifts the gear wheel 36 for the remaining part of this circular pitch. This operation is periodically repeated with each full oscillation of both rotational oscillators 16 and 17. With this kind of stepping and the proper shape of step jewels and teeth of the gear wheel 36, a more or less uniform drive of this gear wheel is possible. Using an appropriate magnitude of the oscillation amplitudes of both oscillators 16 and 17 and an appropriate tooth and step jewel shape, the motion of the gear wheel 36 is practically uniform. In many cases this may be a considerable advantage.

In the form of construction shown in FIG. 3, two sickle-shaped rotational oscillating bodies 50 and 51 are mounted on torsion bars 52 and 53, respectively, and the bars strongly clamped to the frame 15. Four screws 55 and 56 are positioned on each of the rotational oscillation bodies 50 and 51 to serve for poising and adjustment of their inherent oscillation frequency. The impulse of both rotational oscillation bodies 50 and 51 for rotational oscillations is given by a common impulse device 59. In order to simplify the drawing, only the exciter coil 58 of this impulse device 59 is indicated. This exciter coil has terminals 57. The exciter coil is concentrically arranged between the free end pieces of the rotational oscillation bodies 50*a* and 51*a*, which pieces consist of ferromagnetic material. The coil is fixed on one carrier arm 59*a* whose exact location between both the free end pieces 50*a* and 51*a* is adjustable by the adjustment screws 64 and the mounted adjustment carrier 59*b*. This adjustment device exactly adjusts the amplitudes of the rotational oscillations of both rotational oscillation bodies 50 and 51 to a present amount. In the present example the adjustment is for equal amplitudes of both oscillations. A switch arm 67 is positioned on the free end piece 51*b* of the rotational oscillation body 51 and a step jewel 68 is fixed on the free end of the arm. The gear wheel 60 is driven in the rhythm of the oscillations of the rotational oscillation body 51 in the direction of the arrow S by means of this switch arm and its step jewel. A braking device 70 is fixed on frame 15 and consists of a flexible arm 71 and a braking jewel 72, the braking device preventing a turn-back of the gear wheel 60 on the return motion of the switch arm 67. Since this gear wheel brake and pawl are of the conventional type, they are not further explained.

In the forms of construction according to FIGS. 1 and 3, the single rotational oscillation bodies are arranged at a distance from each other on the frame and each transmits its own reactional rotation moments to the frame so that the frame would be affected by rotation moments. However, the rotational oscillators assigned to each other are arranged and excitable to oscillation of such an amplitude that the rotation moments (forces) transmitted from them compensate each other so that the frame remains inactive.

When it is preferred to use rotational oscillators as oscillators of the oscillation system, the arrangement of FIG. 4 is suitable. In this form of construction, each rotational oscillator 80 and 81 includes a rotational symmetrical outer ring 82 and 83, respectively. The outer rings are fixed by means of spokes 84 and 85, respectively, the spokes being bending springs fixed on the central carrier 86 and the carrier fixed on the frame 15. These rotational oscillators 80 and 81 oscillate rotationally in the direction of the double arrow G in a common plane whereby the direction moments which create these oscillations are created by bending of the spokes 84 and 85. This rotational oscilliation arrangement is impulsed by excitment of the exciter coil 87, the coil being fixed on outer ring 83 and cooperating with a permanent magnet 88 connected by the arm 82*a* to the outer ring 82.

In the form of construction according to FIG. 4, the rotational oscillators can be so that their moments of inertia are equal. The moment of inertia of the rotational oscillator 80 is essentially smaller than the moment of inertia of the rotational oscillator 81. In order to obtain the maximum oscillation compensation, the impulse device is arranged so that the ratio of the oscillation amplitudes satisfies the following equation:

$$\frac{w_1}{w_2}=\frac{A_2}{A_1} \qquad (1)$$

where $w_1$=oscillation amplitude of the rotational oscillator 80,
$w_2$=oscillation amplitude of the rotational oscillator 81,
$A_1$=moment of inertia of the rotational oscillator 80,
$A_2$=moment of inertia of the rotational oscillator 81.

Equation 1 can, for instance, be satisfied when $$n_1=n_2 \qquad (2)$$

where $n_1$=inherent oscillation frequency of the rotational oscillator 80, and
$n_2$=inherent oscillation frequency of the rotational oscillator 81.

Since the inherent oscillation frequency is essentially determined by the spring constant of the spokes 84 and 85, Equation 2 can be satisfied by an appropriate proportionment of these spokes.

It is advantageous that both rotational oscillators 80 and 81 oscillate around a common axis and have a common oscillation plane, but this is by no means a necessary condition. According to the invention, both rotational compensating oscillators may be arranged at a distance from each other on the same axis but in different planes of oscillation and no resultant rotation moment will be exerted on the frame.

In the embodiment shown in FIG. 5, the oscillation arrangement 93 is in the form of a horseshoe. Two bending oscillators 91 and 92 are fixed as part of a one-piece arrangement on a center piece 90, with the center piece 90 fixed to frame 15. The inner end pieces 91*a* and 92*a* of both bending oscillators 91 and 92 bent inward and are integral with the bow-shaped piece parts 91*b* and 92*b* of these oscillators so that their impulse action lines H–H' and K–K' are essentially straight and coincide. The impulse device has an exciter coil 98 which cooperates with a permanent magnet 99. These impulse components are fixed on the front faces, which are opposite to each other and parallel, of bending oscillators 91 and 92, respectively.

The form of construction shown in FIGS. 6 and 7 includes four single and straight bending oscillators 100, 101, 102, 103. These bending oscillators have their bent end pieces 100*a*, 101*a*, 102*a*, 103*a* fixed by screws 104 on the upwards bent portions 105*a* of the frame 105. The bending oscillators 100 and 101 and the oscillators 102 and 103 each are an oscillation system. Both bending oscillators of each of those oscillation systems are arranged so that they are impulsed by the coils 109 and 110, respectively, which cooperate with the permanent magnet 107 and 108, so that at times their reaction moments (direction M–M') and reaction forces (direction L–L') are compensating each other.

The reaction moments are in the oscillation direction M–M' perpendicular to the oscillation direction L–L' and are compensated because both oscillation systems are equal in shape and are symmetrically arranged to each other.

In the form of construction of FIG. 8 is shown a variant of the form of construction of FIGS. 6 and 7, so that the conditions are similar as in FIGS. 6 and 7. In FIG. 8 both oscillation systems 120 and 121 each have a tuning fork 122 and 123. These tuning forks are connected with each other by an intermediate part 124. This intermediate piece is the symmetry center point of the oscillation arrangement and therefore stays relatively quiet. The lower end 124*a* of the intermediate piece 124 is fixed on the frame 15.

In the form of construction of FIG. 9, two ring-shaped closed bending oscillators 130 and 131 are arranged in a rectanguar opening 15*a* of the frame 15, and the bending oscillators 130 and 131 are rigidly fixed on the frame by portions 132 and 133 respectively. The bending oscillator 130 has on its front face a concentrically arranged exciter coil 138 and the other bending oscillator 131 has a permanent magnet 139 which cooperates with this coil and is similarly arranged. Both bending oscillators have a common oscillating plane and are symmetrically arranged so that their oscillation impulse action lines are located on their common center line N–N'.

FIG. 10 shows a diaphragm oscillating system which is closed in itself. This oscillating system is symmetrically built in respect to a central symmetry plane called P–P'.

Flexible diaphragms 142 and 144 are positioned on both the upper and lower front openings of a symmetrical case 140. Symmetrical permanent magnets 148 and 149, which reach the interior of the case on extension of the diaphragm, are fixed on the central parts 142*a* and 144*a* of the diaphragms. An exciter coil 151 is fixed relatively rigidly to the interior of the case by ring carrier 150 so that equal forces are exerted by the coil on both permanent magnets 148 and 149. This exciter coil 151 is connected to an exciter circuit (not shown) which excites both diaphragm oscillation systems 142 and 144 in the rhythm of their equal inherent oscillation frequencies.

The form of construction shown in FIG. 11 is similar to that of FIG. 9 in that it utilizes ring-shaped closed bending oscillators 130 and 131. These oscillators are attached to upright support members (pillars) 151 and 152, respectively. The support members are attached to plates 156 and 157, respectively, which in turn are attached by screws 158 to the base 15. The screws 158 protrude through slots in the plate members 156 and 157 so that the plate members may be positioned closer together or further apart. A permanent magnet 139 is attached to the flat portion of ring 131. An exciter coil 138 is attached to the flat portion of ring 130. Compensation weights 154 and 155 are attached on the inside of the flat portion of rings 130 and 131, respectively, and act to compensate for the weight of the coil 138 and magnet 139, respectively.

The construction shown in FIG. 12 is similar to that of FIG. 10. In this embodiment a cylindrical base 140 is attached to two upraised support members 163 and 164. A center plate 150 attached to cylindrical base 140 has at its center a permanent solid cylindrical rod magnet 160. This magnet cooperates with an exciter coil 161 attached to diaphragm 142 and with an exciter coil 162 attached to diaphragm 144. A small cylindrical compensation weight 166 is attached on the outer surface at the center of diaphragm 142 and a similar compensation weight 167 is attached to diaphragm 144. These compensation weights equal the weight of the coil on the other side of their diaphragms. The coils 161 and 162 are excited at the same time. This causes the coils to move away from the fixed permanent magnet 160 and the diaphragms 142 and 144 to move simultaneously outward. The pulse to the exciter coils is short, so that when the flexible diaphragms return to their starting position by their spring action there is no current flowing in the coils.

The construction of FIG. 13 is also similar to that of FIG. 10. In FIG. 13 the cylindrical base 140 is secured to upright support members 163 and 164. Holes 170 are provided in base 140 to permit entry and exit of air into the cylindrical member. The cylindrical member 140 with the attached diaphragms 142 and 144 forms a can-like structure. A coil 168 is attached to diaphragm 142 and a permanent cylindrical member 16*g*, which fits within the coil, is attached to diaphragm 144. A cylindrical compensation weight 166 is attached to the outside of diaphragm 142 and similarly a compensation weight 167 is attached to the outside of diaphragm 144.

For this purpose the diaphragms are formed so that their elasticity in the oscillation direction (in the direction of the axis of the coil and permanent magnet) is greater, preferably at least ten times greater, than in the radial direction. This difference of elasticity in both directions results in the amplitudes of oscillations transverse to the direction of the axis of coil 168 and permanent magnet 169 being small compared with the amplitudes of the oscillations in the axial direction.

The compensation weights mentioned can be used for adjustment of the inherent oscillation frequency of the oscillator to which it is attached. For example, the adjustment can be made by reducing the weight of the compensation weight by drilling or by electro-erosion until the desired inherent oscillation frequency is obtained.

It is preferred that the damping of cooperating single oscillating systems be adjusted to an almost equal magnitude, which results in an optimum compensation and minimum repercussions on the frame plate.

The construction of FIG. 14 is similar to that of FIG. 13, except for the mounting of the coil and magnet. In FIG. 14 the coil 168 is mounted at its circumference within an opening in diaphragm 142. The permanent magnet in this case comprises a cylinder portion and an end 175 to which is attached a cylinder rod magnet 169. The entire magnet structure 177 fits within an opening in diaphragm 144.

In the construction of FIG. 15 the general configuration is again a can-like shape (syphon). The side of the can, i.e. the cylindrical portion 178, in this construction is flexible and is of spring material. Portion 178 is supported by standing members 163 and 164. The ends of the can 179*a* and 180*a* are rigid. End 179*a* has holes 181 for the entry and exit of air. An exciter coil 179*b* is attached to end 179*a* and a permanent magnet 180*b* is attached to end 180*a*.

In the construction of FIG. 16 substantially flat members (bending springs) 190 and 191 are the oscillators and they oscillate along line T—T. These members 190 and 191 may be sections of a diaphragm. The members have ridges, so that they are flexible and spring back to their starting position. Oscillator 190 is clamped at its ends by upright members 183. Oscillator 191 is clamped at its ends by upright members 185. An exciter coil 192 is attached at the center portion 186*a* of oscillator 190. A compensation weight 188 is attached on the outer side of oscillator 190. A cylindrical permanent magnet 193 is attached on one side of oscillator 191 and a compensation weight is attached on its other side. Magnet 193 fits within and cooperates with coil 192 to impulse the oscillators away from each other.

The construction of FIG. 17 is similar to that of FIG. 16, except that both of the oscillators 190 and 191 have coils 195 and 196, respectively, attached to them. A cylindrical bar magnet 197 is fixed to a support member 198*a*. The support member is in turn attached to base member 198. Each of the base members 182, 198 and 184 are adjustable on their underlying base member (not shown).

In the construction of FIG. 18, base members 200 and 201 have fixed thereon upright support members 202 and 203, respectively. A spring oscillator member 206 is attached to support 202 and a similar oscillator 208 is attached to support 203. The oscillators are attached to the supports at their tops and bottoms. The oscillators are in the form of a plate having two elongated holes. The center strip 206*a* and 208*a* of the oscillators 206 and 208, respectively, is free to oscillate perpendicular to the plane of the oscillators. The support members 202 and 203 are cut away to allow this oscillation and, in addition, have holes through them. A permanent magnet 220 is mounted on support member 211*a* attached to base member 211. This cylindrical bar magnet fits within the coil 209 attached to oscillator 206 and also fits within coil 210 attached to oscillator 208. Short cylindrical compensation weights 215 and 216 are attached to the other sides of the oscillators 206 and 208, respectively.

The construction shown in FIG. 19 is similar to that of FIG. 18, except that in the case in FIG. 19 the coil 225 is attached to the oscillator 206. In this form a permanent magnet 226 is attached to the oscillator 208 and coacts with the coil.

In the construction shown in FIG. 20, the base members 254 and 255 have attached thereon upright support members 250 and 251 respectively. These support members are slidable toward and away from each other by means of screws positioned within slots of the support members. A flat spring plate oscillator 232 is attached on one side of support member 250 and a similar oscillator 233 is attached to the other side of the support member 250.

Similarly, oscillator 234 is attached to the front of support 251 and oscillator 235 is attached to the rear of support 251. Each of these oscillators has two elongated holes forming a center strip 232*a*, 233*a*, 234*a* and 235*a* integral with the oscillators 232, 233, 234 and 235, respectively. Strip 232*a* is fixedly held by bar 240 to strip 233*a*. Similarly strip 234*a* is held by bar 241 to strip 235*a*. Each of the oscillators is held to its upright supports at their tops and bottoms. A coil 225 is attchaed to strip 233*a* and permanent magnet 226 is attached to strip 234*a*.

FIG. 21 is a top view showing the construction of FIG. 20. As is shown in FIGS. 20 and 21, the oscillating strips 232*a* and 233*a* are attached to the magnet 226.

In all the described cases the conditions of the formula $A_1w_1$ for the first oscillating arrangement $=A_2w_2$ for the second oscillating arrangement, as mentioned above, is met.

The vibrating system according to FIGS. 22 to 25 has a base 411 fixed on a bottom indicated by 410. On the fore and rear sides of the base, respectively 412 and 414, are fixed vibrators 416 and 417 by means of screws 418. The vibrators 416 and 417 are each provided with base portions 420 and 421 respectively, on which are arranged as the same piece U-shaped partial vibrators 422, 423, 424 and 425 respectively. The partial vibrators 423 and 425, as well as the partial vibrators 422 and 424, are in respect to vibration rigidly connected to each other by connection pieces 428 and 429. These connection pieces are fixed by means of screws, such as 430, on the outer free end pieces of the partial vibrators in such a manner that these free end pieces, as 434, are practically rigidly connected with the plane front faces, as 435, of the connection pieces. With this structure, the partial vibrating systems vibrate in a straight line when the outer arm, as 438, of the concerned partial vibrator is approximately equal in length to the inner arm, as 439. However, the condition for this is that the partial vibrators have a constant and identical cross section as it is the case in this form of construction. Since in this form of construction the masses of the connection pieces (the parts on the connection pieces) are essentially greater than the masses of the partial vibrators (the masses arranged upon the proper flexible parts of the partial vibrator) the connection pieces vibrate practically in a straight line.

In this form of construction, the fastening spot of the connection pieces on the partial vibrators is in such a manner that the connection pieces themselves vibrate practically in a straight line. The effects caused by the vibrating masses of the partial vibrators 422 to 425 are negligible small compared with the effects caused by the connection pieces. When the vibrating mass of the partial vibrators is not negligibly small, or when these partial vibrators have some additional masses fixed on them, the connection piece is arranged on the partial vibrators in such a manner that the resultant center of gravity of the concerned partial vibrating system vibrates in a straight line.

The exciter coil 442 is fixed on the conection piece 429 by means of the L-shaped coil carrier 440 and 441 which are screwed on the connection piece 429. A compensation weight 444 is glued on the coil 442 on the opposite side of the connection piece 429. The mass of the compensation weight is defined in such a manner that the center of gravity of this partial vibrating system consisting of the parts 422, 424, 429, 440, 441, 442 and 444, is located in the middle plane traced by the symmetry lines E–E′ of both vibrators 416 and 417. The connection piece 429 is on the outer arms 438 of both partial vibrators 422 and 421 in such a position that the center of gravity of this partial vibrating system vibrates in a straight line. On the connection piece 428 is fixed a permanent magnet 454 by means of the L-shaped carriers 452 and 453 above cylindrical plastic pieces 472 and 473. The permanent magnet protrudes partially into the coil 442 and cooperates with this coil in such a manner that the connection pieces 428 and 429 are excitable to oppositely directed vibrations of the same amount of energy. The coil 442 is self controlling excited by a usual exciter current circuit in the rhythm of the inherent frequency of the vibrating system in such a manner that a vibration of a defined amplitude will be maintained. The coil terminals are shown by 458 and 459. E.g. as a control and exciter current circuit a current circuit described in U.S. Patent 3,084,316 (Zemla) can be used.

On the carriers 452 and 453 compensation weights 460 and 461 are attached by which the center of gravity of the partial vibrating system consisting of the parts 423, 425, 428, 452, 453, 454, 472 and 473, will also be located in the middle plane of the shown vibrating system. Also here the connection piece 428 is fixed on the partial vibrators 423 and 425 in such a manner that this mentioned center of gravity has a straight lined motion. In this form of construction the centers of gravity of both partial vibrating systems are located in the same plane and they vibrate in a common straight line. An optimum rate accuracy of the concerned vibrating system will thereby be obtained. This is certainly especially due to the fact that the vibrations of the vibrating system will not be transmitted to the base so that the damping of this system is minimum. Besides this, as already mentioned, this system is insensitive to positions.

In the form of construction shown in FIGS. 26 and 27, the entirety of the vibrators 508 and 509, which by means of the screws 502 and 501 and the associated supporting tubes 503 and 504 are fixed on the base 500, are formed and arranged in such a manner that the partial vibrators 510, 511 and 512, 513 and arranged in series in the vibration direction. The outer free end pieces 516 and 517 of the partial vibrators 510 and 513 are vibratingly rigidly connected to each other by a connection frame 520. The fixation of these free end pieces 516 and 517 on the frame 520 is in this preferred form of construction such that the free end pieces are not firmly pressed on the opposite frame faces 522, 523 but they can adjust themselves to a certain extent oblique to these frame faces. This will be obtained by an appropriate position of the screws 524 and 525. By this limiting condition in the present case, the partial vibrators have a constant cross-section and a straight lined motion of the center of gravity of this partial vibrating system will be obtained when the length of the free outer arms 526 and 527 of the partial vibrators 510 and 513 are approximately half as long as the corresponding inner arms 530 and 531. Since the mass of the partial vibrators 510 and 513 is negligibly small compared with the mass of the frame 520 and the coil 535 fixed on this frame, according to the precedingly described condition, the frame vibrates practically along a straight line. The exciter coil 535 is fixed centrically to the longitudinal axis of the frame by means of four angle plates 536 and screws, as 537. The coil is electrically connected by the circuit 539 with the frame which is grounded by the ground wire 540, and by the circuit 541 with a terminal 543 fixed in an insulation tube 542. The circuit 544 wired to the terminal 543, connects the coil with a not shown control and exciter current circuit which can be of a known kind, e.g. of the design shown in connection with the form of construction according to FIGS. 22 and 25, and by which the coil will automatically be excited in the rhythm of the inherent vibration frequency of the vibration system.

The partial vibrators 511 and 512 are connected with each other by means of the cylindrical connection piece 579 fixed on the free end pieces 546 and 547. This connection piece 579 consists of a bar magnet 580 and a non-conductive intermediate piece 581. The magnet 580 cooperates with the exciter coil to drive this vibration system. The fixation of the connection piece 579 on the free end pieces 546 and 547 is also so loose that these end pieces are able to adjust themselves slightly oblique to both front faces 550 and 551 of the connection piece.

Flexible diaphragms 142 and 144 are positioned on both the upper and lower front openings of a symmetrical case 140. Symmetrical permanent magnets 148 and 149, which reach the interior of the case on extension of the diaphragm, are fixed on the central parts 142*a* and 144*a* of the diaphragms. An exciter coil 151 is fixed relatively rigidly to the interior of the case by ring carrier 150 so that equal forces are exerted by the coil on both permanent magnets 148 and 149. This exciter coil 151 is connected to an exciter circuit (not shown) which excites both diaphragm oscillation systems 142 and 144 in the rhythm of their equal inherent oscillation frequencies.

The form of construction shown in FIG. 11 is similar to that of FIG. 9 in that it utilizes ring-shaped closed bending oscillators 130 and 131. These oscillators are attached to upright support members (pillars) 151 and 152, respectively. The support members are attached to plates 156 and 157, respectively, which in turn are attached by screws 158 to the base 15. The screws 158 protrude through slots in the plate members 156 and 157 so that the plate members may be positioned closer together or further apart. A permanent magnet 139 is attached to the flat portion of ring 131. An exciter coil 138 is attached to the flat portion of ring 130. Compensation weights 154 and 155 are attached on the inside of the flat portion of rings 130 and 131, respectively, and act to compensate for the weight of the coil 138 and magnet 139, respectively.

The construction shown in FIG. 12 is similar to that of FIG. 10. In this embodiment a cylindrical base 140 is attached to two upraised support members 163 and 164. A center plate 150 attached to cylindrical base 140 has at its center a permanent solid cylindrical rod magnet 160. This magnet cooperates with an exciter coil 161 attached to diaphragm 142 and with an exciter coil 162 attached to diaphragm 144. A small cylindrical compensation weight 166 is attached on the outer surface at the center of diaphragm 142 and a similar compensation weight 167 is attached to diaphragm 144. These compensation weights equal the weight of the coil on the other side of their diaphragms. The coils 161 and 162 are excited at the same time. This causes the coils to move away from the fixed permanent magnet 160 and the diaphragms 142 and 144 to move simultaneously outward. The pulse to the exciter coils is short, so that when the flexible diaphragms return to their starting position by their spring action there is no current flowing in the coils.

The construction of FIG. 13 is also similar to that of FIG. 10. In FIG. 13 the cylindrical base 140 is secured to upright support members 163 and 164. Holes 170 are provided in base 140 to permit entry and exit of air into the cylindrical member. The cylindrical member 140 with the attached diaphragms 142 and 144 forms a can-like structure. A coil 168 is attached to diaphragm 142 and a permanent cylindrical member 16*g*, which fits within the coil, is attached to diaphragm 144. A cylindrical compensation weight 166 is attached to the outside of diaphragm 142 and similarly a compensation weight 167 is attached to the outside of diaphragm 144.

For this purpose the diaphragms are formed so that their elasticity in the oscillation direction (in the direction of the axis of the coil and permanent magnet) is greater, preferably at least ten times greater, than in the radial direction. This difference of elasticity in both directions results in the amplitudes of oscillations transverse to the direction of the axis of coil 168 and permanent magnet 169 being small compared with the amplitudes of the oscillations in the axial direction.

The compensation weights mentioned can be used for adjustment of the inherent oscillation frequency of the oscillator to which it is attached. For example, the adjustment can be made by reducing the weight of the compensation weight by drilling or by electro-erosion until the desired inherent oscillation frequency is obtained.

It is preferred that the damping of cooperating single oscillating systems be adjusted to an almost equal magnitude, which results in an optimum compensation and minimum repercussions on the frame plate.

The construction of FIG. 14 is similar to that of FIG. 13, except for the mounting of the coil and magnet. In FIG. 14 the coil 168 is mounted at its circumference within an opening in diaphragm 142. The permanent magnet in this case comprises a cylinder portion and an end 175 to which is attached a cylinder rod magnet 169. The entire magnet structure 177 fits within an opening in diaphragm 144.

In the construction of FIG. 15 the general configuration is again a can-like shape (syphon). The side of the can, i.e. the cylindrical portion 178, in this construction is flexible and is of spring material. Portion 178 is supported by standing members 163 and 164. The ends of the can 179*a* and 180*a* are rigid. End 179*a* has holes 181 for the entry and exit of air. An exciter coil 179*b* is attached to end 179*a* and a permanent magnet 180*b* is attached to end 180*a*.

In the construction of FIG. 16 substantially flat members (bending springs) 190 and 191 are the oscillators and they oscillate along line T—T. These members 190 and 191 may be sections of a diaphragm. The members have ridges, so that they are flexible and spring back to their starting position. Oscillator 190 is clamped at its ends by upright members 183. Oscillator 191 is clamped at its ends by upright members 185. An exciter coil 192 is attached at the center portion 186*a* of oscillator 190. A compensation weight 188 is attached on the outer side of oscillator 190. A cylindrical permanent magnet 193 is attached on one side of oscillator 191 and a compensation weight is attached on its other side. Magnet 193 fits within and cooperates with coil 192 to impulse the oscillators away from each other.

The construction of FIG. 17 is similar to that of FIG. 16, except that both of the oscillators 190 and 191 have coils 195 and 196, respectively, attached to them. A cylindrical bar magnet 197 is fixed to a support member 198*a*. The support member is in turn attached to base member 198. Each of the base members 182, 198 and 184 are adjustable on their underlying base member (not shown).

In the construction of FIG. 18, base members 200 and 201 have fixed thereon upright support members 202 and 203, respectively. A spring oscillator member 206 is attached to support 202 and a similar oscillator 208 is attached to support 203. The oscillators are attached to the supports at their tops and bottoms. The oscillators are in the form of a plate having two elongated holes. The center strip 206*a* and 208*a* of the oscillators 206 and 208, respectively, is free to oscillate perpendicular to the plane of the oscillators. The support members 202 and 203 are cut away to allow this oscillation and, in addition, have holes through them. A permanent magnet 220 is mounted on support member 211*a* attached to base member 211. This cylindrical bar magnet fits within the coil 209 attached to oscillator 206 and also fits within coil 210 attached to oscillator 208. Short cylindrical compensation weights 215 and 216 are attached to the other sides of the oscillators 206 and 208, respectively.

The construction shown in FIG. 19 is similar to that of FIG. 18, except that in the case in FIG. 19 the coil 225 is attached to the oscillator 206. In this form a permanent magnet 226 is attached to the oscillator 208 and coacts with the coil.

In the construction shown in FIG. 20, the base members 254 and 255 have attached thereon upright support members 250 and 251 respectively. These support members are slidable toward and away from each other by means of screws positioned within slots of the support members. A flat spring plate oscillator 232 is attached on one side of support member 250 and a similar oscillator 233 is attached to the other side of the support member 250.

Similarly, oscillator 234 is attached to the front of support 251 and oscillator 235 is attached to the rear of support 251. Each of these oscillators has two elongated holes forming a center strip 232*a*, 233*a*, 234*a* and 235*a* integral with the oscillators 232, 233, 234 and 235, respectively. Strip 232*a* is fixedly held by bar 240 to strip 233*a*. Similarly strip 234*a* is held by bar 241 to strip 235*a*. Each of the oscillators is held to its upright supports at their tops and bottoms. A coil 225 is attchaed to strip 233*a* and permanent magnet 226 is attached to strip 234*a*.

FIG. 21 is a top view showing the construction of FIG. 20. As is shown in FIGS. 20 and 21, the oscillating strips 232*a* and 233*a* are attached to the magnet 226.

In all the described cases the conditions of the formula $A_1w_1$ for the first oscillating arrangement $=A_2w_2$ for the second oscillating arrangement, as mentioned above, is met.

The vibrating system according to FIGS. 22 to 25 has a base 411 fixed on a bottom indicated by 410. On the fore and rear sides of the base, respectively 412 and 414, are fixed vibrators 416 and 417 by means of screws 418. The vibrators 416 and 417 are each provided with base portions 420 and 421 respectively, on which are arranged as the same piece U-shaped partial vibrators 422, 423, 424 and 425 respectively. The partial vibrators 423 and 425, as well as the partial vibrators 422 and 424, are in respect to vibration rigidly connected to each other by connection pieces 428 and 429. These connection pieces are fixed by means of screws, such as 430, on the outer free end pieces of the partial vibrators in such a manner that these free end pieces, as 434, are practically rigidly connected with the plane front faces, as 435, of the connection pieces. With this structure, the partial vibrating systems vibrate in a straight line when the outer arm, as 438, of the concerned partial vibrator is approximately equal in length to the inner arm, as 439. However, the condition for this is that the partial vibrators have a constant and identical cross section as it is the case in this form of construction. Since in this form of construction the masses of the connection pieces (the parts on the connection pieces) are essentially greater than the masses of the partial vibrators (the masses arranged upon the proper flexible parts of the partial vibrator) the connection pieces vibrate practically in a straight line.

In this form of construction, the fastening spot of the connection pieces on the partial vibrators is in such a manner that the connection pieces themselves vibrate practically in a straight line. The effects caused by the vibrating masses of the partial vibrators 422 to 425 are negligible small compared with the effects caused by the connection pieces. When the vibrating mass of the partial vibrators is not negligibly small, or when these partial vibrators have some additional masses fixed on them, the connection piece is arranged on the partial vibrators in such a manner that the resultant center of gravity of the concerned partial vibrating system vibrates in a straight line.

The exciter coil 442 is fixed on the conection piece 429 by means of the L-shaped coil carrier 440 and 441 which are screwed on the connection piece 429. A compensation weight 444 is glued on the coil 442 on the opposite side of the connection piece 429. The mass of the compensation weight is defined in such a manner that the center of gravity of this partial vibrating system consisting of the parts 422, 424, 429, 440, 441, 442 and 444, is located in the middle plane traced by the symmetry lines E–E′ of both vibrators 416 and 417. The connection piece 429 is on the outer arms 438 of both partial vibrators 422 and 421 in such a position that the center of gravity of this partial vibrating system vibrates in a straight line. On the connection piece 428 is fixed a permanent magnet 454 by means of the L-shaped carriers 452 and 453 above cylindrical plastic pieces 472 and 473. The permanent magnet protrudes partially into the coil 442 and cooperates with this coil in such a manner that the connection pieces 428 and 429 are excitable to oppositely directed vibrations of the same amount of energy. The coil 442 is self controlling excited by a usual exciter current circuit in the rhythm of the inherent frequency of the vibrating system in such a manner that a vibration of a defined amplitude will be maintained. The coil terminals are shown by 458 and 459. E.g. as a control and exciter current circuit a current circuit described in U.S. Patent 3,084,316 (Zemla) can be used.

On the carriers 452 and 453 compensation weights 460 and 461 are attached by which the center of gravity of the partial vibrating system consisting of the parts 423, 425, 428, 452, 453, 454, 472 and 473, will also be located in the middle plane of the shown vibrating system. Also here the connection piece 428 is fixed on the partial vibrators 423 and 425 in such a manner that this mentioned center of gravity has a straight lined motion. In this form of construction the centers of gravity of both partial vibrating systems are located in the same plane and they vibrate in a common straight line. An optimum rate accuracy of the concerned vibrating system will thereby be obtained. This is certainly especially due to the fact that the vibrations of the vibrating system will not be transmitted to the base so that the damping of this system is minimum. Besides this, as already mentioned, this system is insensitive to positions.

In the form of construction shown in FIGS. 26 and 27, the entirety of the vibrators 508 and 509, which by means of the screws 502 and 501 and the associated supporting tubes 503 and 504 are fixed on the base 500, are formed and arranged in such a manner that the partial vibrators 510, 511 and 512, 513 and arranged in series in the vibration direction. The outer free end pieces 516 and 517 of the partial vibrators 510 and 513 are vibratingly rigidly connected to each other by a connection frame 520. The fixation of these free end pieces 516 and 517 on the frame 520 is in this preferred form of construction such that the free end pieces are not firmly pressed on the opposite frame faces 522, 523 but they can adjust themselves to a certain extent oblique to these frame faces. This will be obtained by an appropriate position of the screws 524 and 525. By this limiting condition in the present case, the partial vibrators have a constant cross-section and a straight lined motion of the center of gravity of this partial vibrating system will be obtained when the length of the free outer arms 526 and 527 of the partial vibrators 510 and 513 are approximately half as long as the corresponding inner arms 530 and 531. Since the mass of the partial vibrators 510 and 513 is negligibly small compared with the mass of the frame 520 and the coil 535 fixed on this frame, according to the precedingly described condition, the frame vibrates practically along a straight line. The exciter coil 535 is fixed centrically to the longitudinal axis of the frame by means of four angle plates 536 and screws, as 537. The coil is electrically connected by the circuit 539 with the frame which is grounded by the ground wire 540, and by the circuit 541 with a terminal 543 fixed in an insulation tube 542. The circuit 544 wired to the terminal 543, connects the coil with a not shown control and exciter current circuit which can be of a known kind, e.g. of the design shown in connection with the form of construction according to FIGS. 22 and 25, and by which the coil will automatically be excited in the rhythm of the inherent vibration frequency of the vibration system.

The partial vibrators 511 and 512 are connected with each other by means of the cylindrical connection piece 579 fixed on the free end pieces 546 and 547. This connection piece 579 consists of a bar magnet 580 and a non-conductive intermediate piece 581. The magnet 580 cooperates with the exciter coil to drive this vibration system. The fixation of the connection piece 579 on the free end pieces 546 and 547 is also so loose that these end pieces are able to adjust themselves slightly oblique to both front faces 550 and 551 of the connection piece.

This connection piece 579 is hereby arranged in such a manner that the center of gravity of the associated partial vibrating system vibrates practically in a straight line and this is in the same straight line in which also the center of gravity of the other partial vibrating system vibrates. This vibrating system is also optimum vibration compensated.

When the vibrating masses of both vibrating systems are different in size, the magnitude of the vibration amplitude of each of both partial vibration systems adjusts itself so that practically a complete vibration compensation will be obtained. However, in some cases it will be advantageous when the vibrating masses of both partial vibrating systems correspondingly vibrate practically with the same amplitude.

The free end pieces 516, 517, 546 and 547 of the partial vibrators 510, 511, 512 and 513 may be rigidly connected with the frame 520 respectively 579.

The ideal criteria for a double-balance vibrator is that (a) there is mutual compensation of the opposite directions of vibration, (b) the springs upon which the vibrator is mounted are weak in the direction of the desired oscillation and strong in other directions, to reduce spurious modes, (c) the vibrators be connected at their nodal points, (d) there be an even number, preferably two, vibrators to avoid a turning moment to the base, (e) the compensated vibrators be joined to the base close together to each other so that their vibrations do not travel far in the base before being compensated, (f) the motion of the vibrators be linear, i.e. along a straight line, and (g) the centers of gravity of the vibrators are as close together as possible to avoid a turning moment to the base. Of the various embodiments described in this application, the embodiment of FIGS. 22–27 best meet these criteria.

We claim:

1. A frequency standard for watches having a frame, said standard comprising a mechanical vibrator and a base; the base being mounted on the frame;

said vibrator comprising four thin reeds, each of said reeds being mounted on said base;

the oscillations of the vibrator being compensated so that substantially no vibrations are transmitted to the frame;

said reeds being positioned and arranged into first and second pairs of reeds with each reed of the first pair being coupled to a different reed of the second pair by connection pieces and so that the two sets of coupled reeds simultaneously vibrate in opposite directions, with one reed of each pair vibrating oppositely to the other reed of that pair;

and the vibrator being so constructed so that the centers of gravity of the coupled reeds vibrate along substantially straight lines.

2. A frequency standard as in claim 1, the connection pieces have greater mass than the reeds.

3. A frequency standard according to claim 1, in which the reeds are in series in the vibration direction.

4. A frequency standard according to claim 1, the reeds of each pair are arranged perpendicular to the vibration direction and next to each other.

5. A frequency standard according to claim 1, all reeds are arranged in series in the vibration direction.

6. A frequency standard according to claim 1, in which all the reeds are arranged on a common base.

7. A frequency standard according to claim 1, the centers of gravity of all the reeds vibrate at least approximately in a common straight line.

8. A frequency standard according to claim 1, an electromagnetic vibration impulse is provided by one exciter coil and a core cooperating with the coil on the connection pieces.

References Cited by the Examiner

UNITED STATES PATENTS

| | | | |
|---|---|---|---|
| 1,781,513 | 11/30 | Holweck | 84—409 |
| 1,963,719 | 6/34 | Schelkunoff | 84—402 |
| 2,861,256 | 11/58 | Hart | 340—6 |
| 2,939,971 | 6/60 | Holt | 310—15 |
| 3,107,481 | 10/63 | Oram | 58—23 |

FOREIGN PATENTS

| | | |
|---|---|---|
| 1,334,105 | 11/63 | France. |

LEO SMILOW, *Primary Examiner.*